US012513242B2

(12) United States Patent
McAndrew et al.

(10) Patent No.: US 12,513,242 B2
(45) Date of Patent: *Dec. 30, 2025

(54) 911 ADDRESS UPDATE

(71) Applicant: Level 3 Communications, LLC, Broomfield, CO (US)

(72) Inventors: Bridget McAndrew, Denver, CO (US); Anne Kempen, Denver, CO (US); Sudhir Dadi, Westminster, CO (US); Corey Curtis, Owasso, OK (US); Michael Robles, Arvada, CO (US); Kevin Michelsen, Penfield, NY (US)

(73) Assignee: Level 3 Communications, LLC, Denver, CO (US)

( * ) Notice: Subject to any disclaimer, the term of this patent is extended or adjusted under 35 U.S.C. 154(b) by 77 days.

This patent is subject to a terminal disclaimer.

(21) Appl. No.: 18/442,440

(22) Filed: Feb. 15, 2024

(65) Prior Publication Data

US 2024/0259495 A1 Aug. 1, 2024

Related U.S. Application Data

(63) Continuation of application No. 17/733,283, filed on Apr. 29, 2022, now Pat. No. 11,909,915.

(Continued)

(51) Int. Cl.
*H04M 3/51* (2006.01)
*G01S 19/01* (2010.01)
(Continued)

(52) U.S. Cl.
CPC ........... *H04M 3/5116* (2013.01); *G01S 19/01* (2013.01); *H04W 4/029* (2018.02); *H04W 4/90* (2018.02);
(Continued)

(58) Field of Classification Search
CPC .. H04M 3/51; H04M 3/5116; H04M 2242/04; H04M 2242/30; H04W 4/029; H04W 4/90; G01S 19/01
(Continued)

(56) References Cited

U.S. PATENT DOCUMENTS 10,749,824 B1 * 8/2020 Robles ................. H04M 3/5116
2008/0200143 A1 * 8/2008 Qiu ........................ H04M 11/04
455/404.2

(Continued)

*Primary Examiner* — Maria El-Zoobi

(57) ABSTRACT

Novel tools and techniques are provided for implementing 911 or enhanced 911 ("E911") address update. In various embodiments, in response to a trigger event, a computing system may determine whether E911 address data associated with a customer that is stored in an E911 database requires updating. If so, the computing system may update the E911 database with address data associated with the customer that has been validated or verified (if available). Where no validated or verified address associated with the customer is available, the computing system may send a message to the customer to provide updated 911 or E911 address data; may receive, from a user device associated with the customer via an API over a network(s) operated by the service provider, updated 911 or E911 address data from the customer; and may update the E911 database with the received updated 911 or E911 address data from the customer.

18 Claims, 10 Drawing Sheets

Related U.S. Application Data

(60) Provisional application No. 63/181,750, filed on Apr. 29, 2021.

(51) Int. Cl.
    *H04W 4/029*     (2018.01)
    *H04W 4/90*     (2018.01)

(52) U.S. Cl.
    CPC .... *H04M 2242/04* (2013.01); *H04M 2242/30* (2013.01)

(58) Field of Classification Search
    USPC .......................................................... 379/45
    See application file for complete search history.

(56) References Cited

U.S. PATENT DOCUMENTS

| | | | |
|---|---|---|---|
| 2008/0304487 A1* | 12/2008 | Kotecha | H04L 65/1076 455/466 |
| 2009/0003312 A1* | 1/2009 | Velazquez | H04W 4/02 370/352 |
| 2019/0082312 A1* | 3/2019 | Neybert | H04W 4/02 |
| 2022/0353368 A1 | 11/2022 | McAndrew | |
| 2023/0199461 A1* | 6/2023 | Allen | H04W 4/021 455/404.2 |
| 2024/0129703 A1* | 4/2024 | Lang | H04W 4/90 |
| 2024/0396625 A1* | 11/2024 | Martin | H04W 4/02 |

* cited by examiner

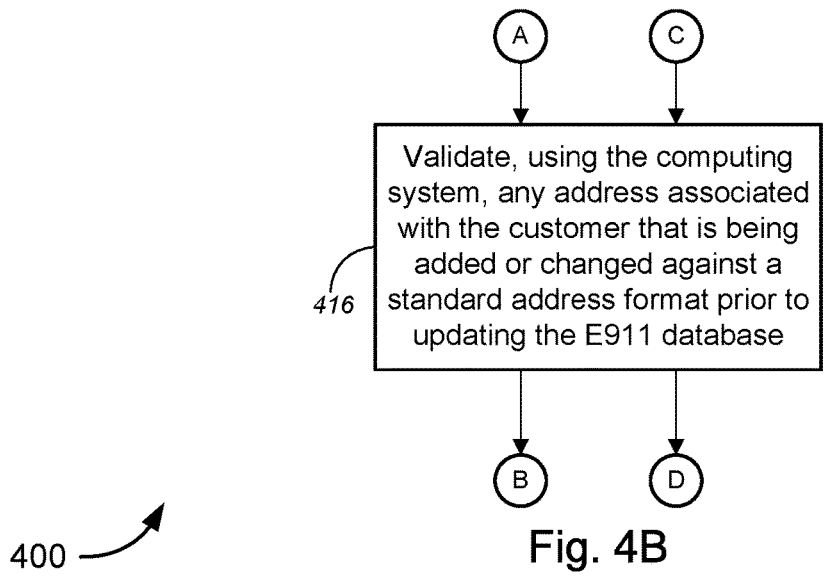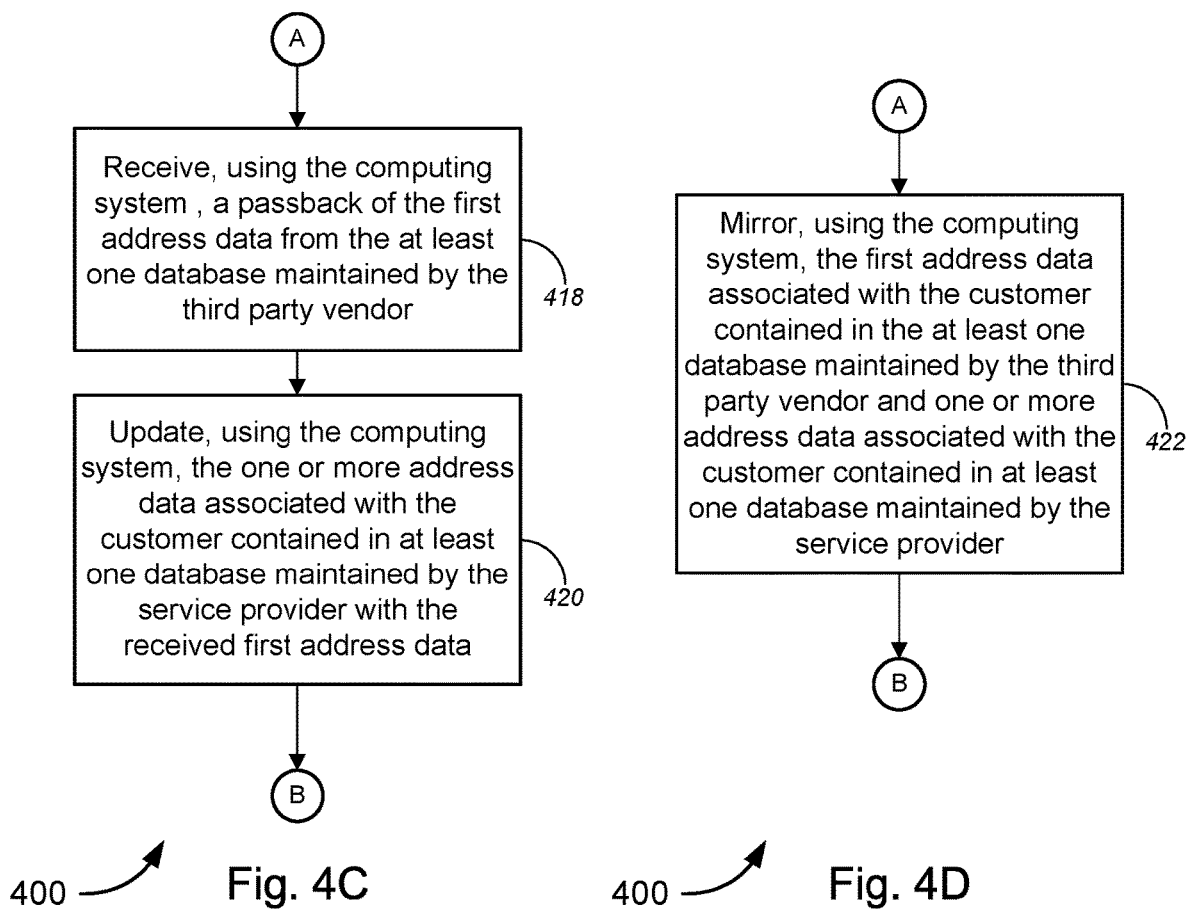

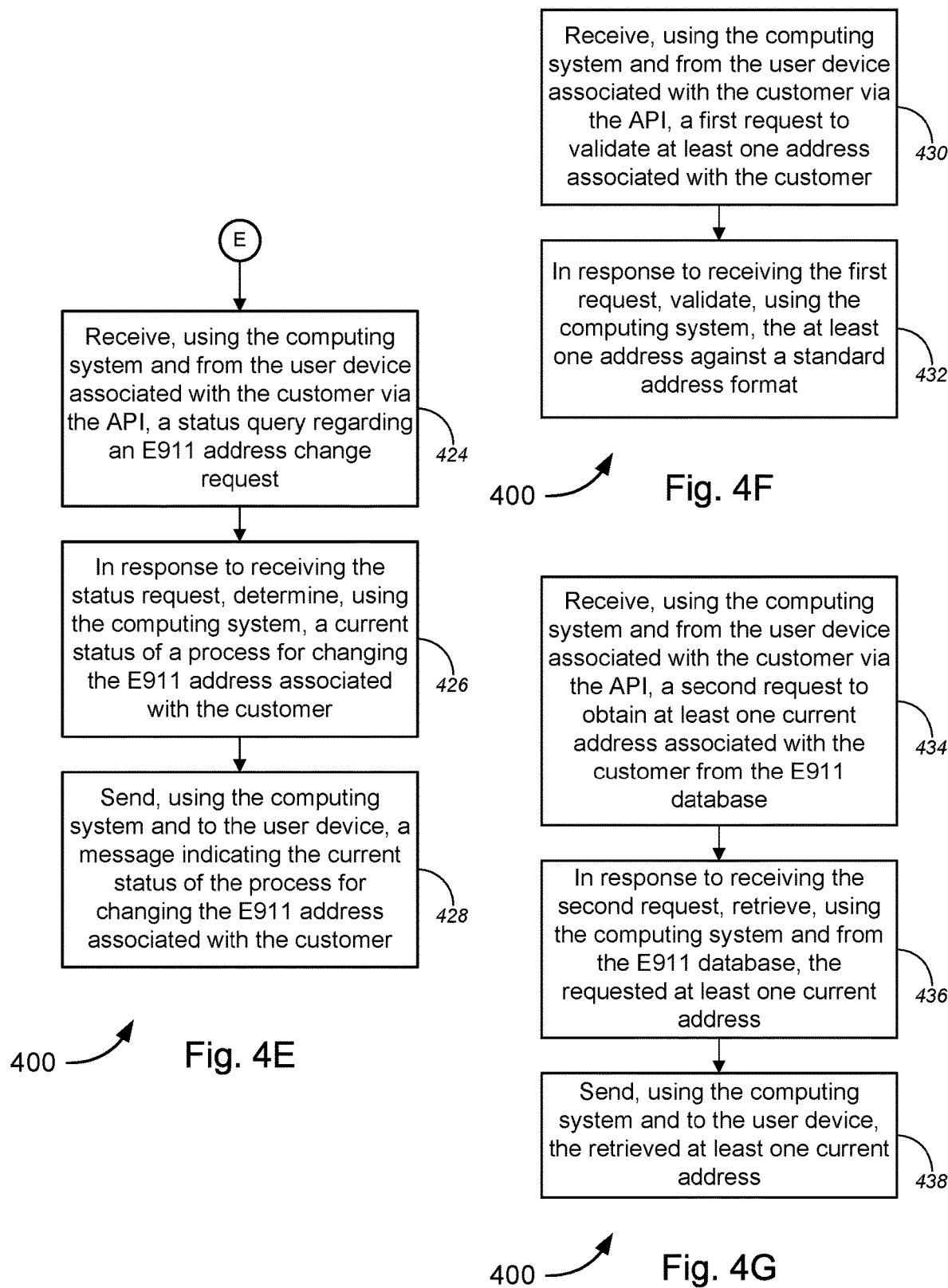

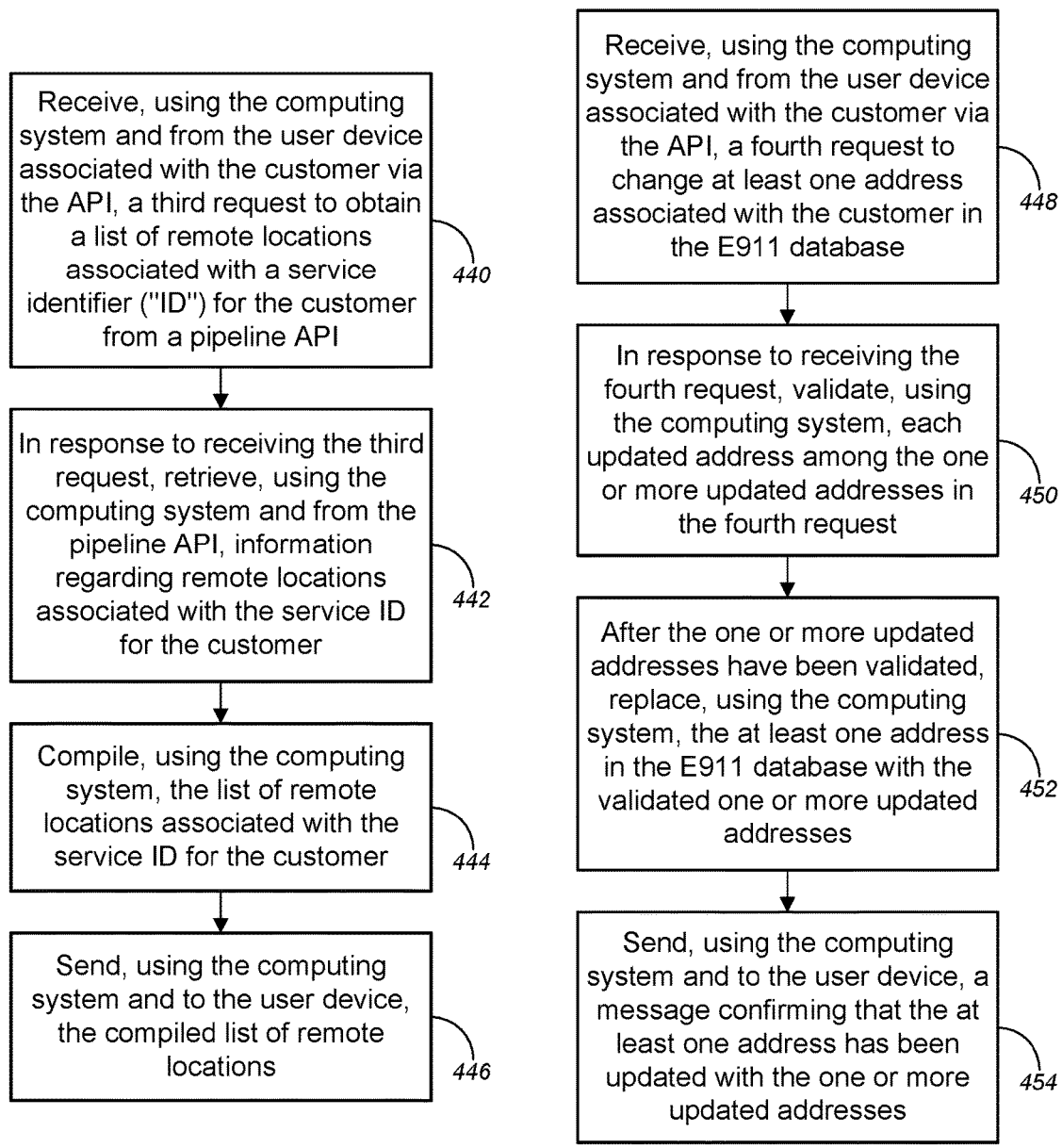

911 ADDRESS UPDATE

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing public safety service point ("PSAP") operations and functionalities, and, more particularly, to methods, systems, and apparatuses for implementing 911 or enhanced 911 ("E911") address update.

BACKGROUND

Traditionally, 911 or enhanced 911 ("E911") address updates are performed by third party vendors on behalf of a service provider or a customer of the service provider. Such 911 or E911 address updates are typically performed by the third party vendor without any supervision or control by the service provider. As such, where a third party vendor updates, validates, or changes a customer's 911 or E911 address, such updated, validated, or changed address information may not always be passed back to the service provider. Also, a customer may not diligently update its 911 or E911 address with a public safety service point ("PSAP") or with the service provider. Accordingly, two or more of the E911 database, the third party vendor database, and the service provider database may contain inconsistent 911 or E911 address information for the customer, which may lead to potential life-threatening issues with the wrong E911 address being relayed to first responders by local PSAPs during an emergency.

Further, conventional 911 or E911 address updating is typically performed manually or using in-person calling, verification, and updating, or the like, resulting in 911 or E911 address updates that may take days or longer to take effect.

Hence, there is a need for more robust and scalable solutions for implementing PSAP operations and functionalities, and, more particularly, to methods, systems, and apparatuses for implementing 911 or E911 address update.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-4I are flow diagrams illustrating a method for implementing 911 or E911 address update, in accordance with various embodiments.

DETAILED DESCRIPTION OF CERTAIN EMBODIMENTS

Overview

Figure 1:
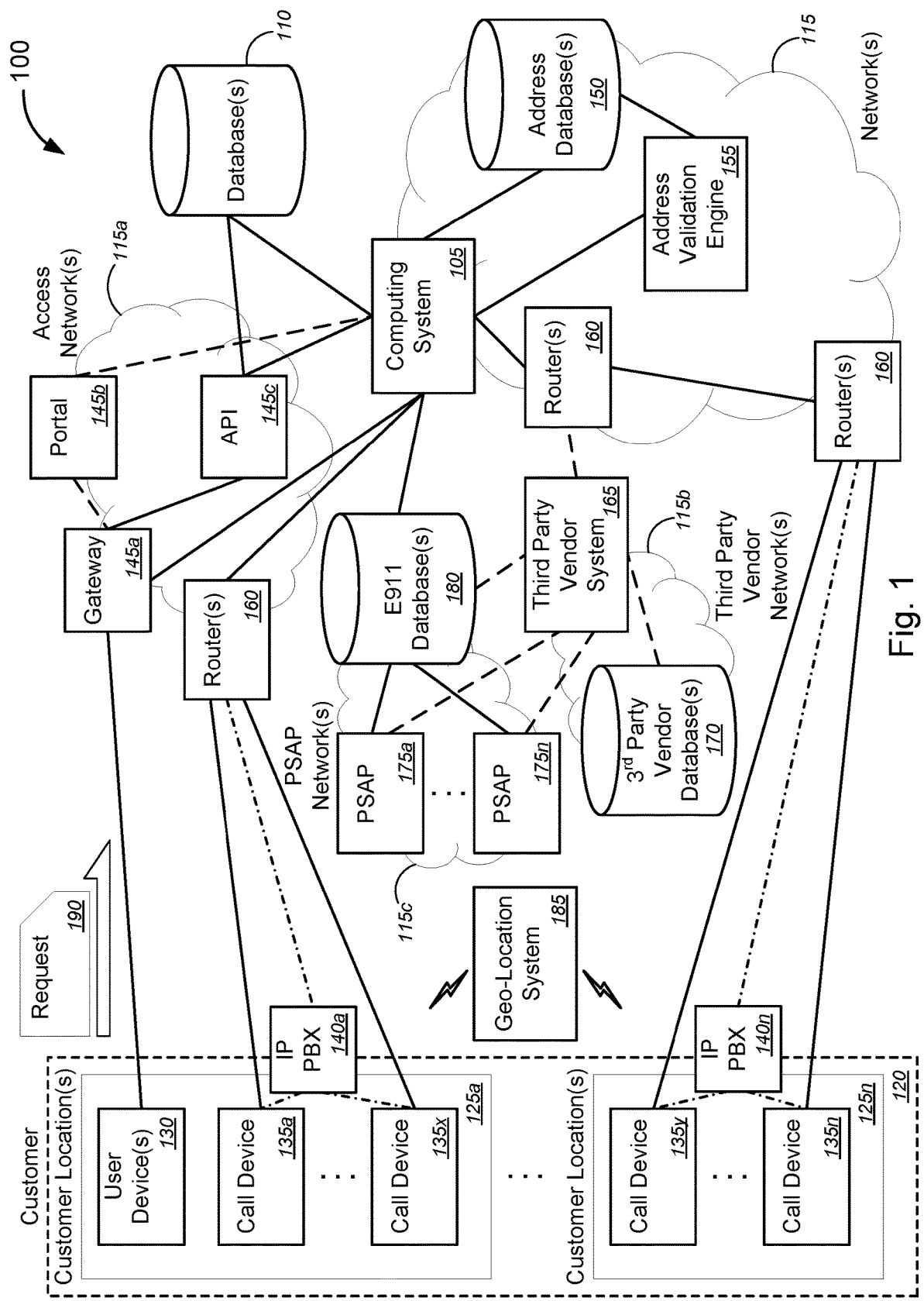
FIG. 1 is a schematic diagram illustrating a system for implementing 911 or enhanced 911 ("E911") address update, in accordance with various embodiments.

Various embodiments provide tools and techniques for implementing public safety service point ("PSAP") operations and functionalities, and, more particularly, to methods, systems, and apparatuses for implementing 911 or enhanced 911 ("E911") address update.

In various embodiments, in response to a trigger event, a computing system may determine whether a set of 911 or E911 address data associated with a customer that is stored in an E911 database requires updating. If so, the computing system may determine whether any address data associated with the customer is contained in at least one database accessible by the computing system and whether any address data associated with the customer that is contained in the at least one database has been validated or verified, where the at least one database is separate from the E911 database(s). Based on a determination that the at least one database contains first address data associated with the customer that has been validated or verified, the computing system may update the E911 database with the first address data associated with the customer that is contained in the at least one database and that has been validated or verified.

Based on a determination that the at least one database does not contain any address data associated with the customer or that any address data associated with the customer that is contained in the at least one database has not been validated or verified, the computing system may send a message to the customer to provide updated 911 or E911 address data; may receive, from a user device associated with the customer via an API over a network(s) operated by the service provider, updated 911 or E911 address data from the customer; and in response to receiving updated 911 or E911 address data from the customer, may update the E911 database with the received updated 911 or E911 address data from the customer.

According to some embodiments, the trigger event may include, but is not limited to, one of: receiving an order to add, remove, or change telephone service associated with the customer; receiving an order to relocate at least one call device having a corresponding telephone number associated with the customer from a first area to a second area within a known geographic location associated with the customer; receiving an order to relocate at least one call device having a corresponding associated with the customer from a first area in a first location associated with the customer to a second area in a second location, the second location being in a geographically separate part of a region from the first location, wherein the region comprises one of a neighborhood, a campus, a section of a municipality, an entire municipality, a state, a collection of neighboring states, a country, or a continent; receiving an order to set up at least one work-from-home call device for a corresponding at least one employee of the customer, the at least one work-from-home call device having a corresponding telephone number associated with the customer; receiving a notification that a business telephone directory maintained by the customer has changed; receiving a notification that a telephone number associated with the customer is involved in a session initiation protocol ("SIP")-based communication from a location different from any E911 addresses associated with the customer as stored in the E911 database, based on geo-location data; receiving a notification indicating a change in geo-location data associated with a telephone number associated with the customer that is involved in a SIP-based communication; receiving a notification that a telephone number associated with the customer is involved in a SIP-based communication from a location different from any E911 addresses associated with the customer as stored in the E911 database, based on Internet Protocol ("IP") address data; receiving a notification indicating a change in IP address associated with a telephone number associated with the customer that is involved in a SIP-based communication; receiving a request from the customer to update at least one address in the E911 database; receiving a notification indicating that a third party vendor has changed at least one E911 address associated with the customer in at least one database; or receiving instructions to initiate an E911 address audit for the customer; and/or the like.

In some cases, the geo-location data may include, without limitation, one of global positioning system ("GPS") data, assisted GPS ("A-GPS") data, global navigation satellite system ("GLONASS") data, assisted GLONASS ("A-GLONASS") data, Galileo global navigation satellite system ("GNSS") data, BeiDou navigation satellite system ("BDS") data, geographic information system ("GIS") data, geocoded address data, cellular network radiolocation-based data, wireless phase one ("WPH1") location data, or wireless phase two ("WPH2") location data, and/or the like.

In some embodiments, determining whether the set of 911 or E911 address data associated with the customer requires updating may comprise determining whether the set of 911 or E911 address data requires updating based on one of: a transfer of telephone service for the customer from an unaffiliated service provider; a stated or detected change in geo-location data of at least one call device having a corresponding telephone number associated with the customer; a change in a business telephone directory maintained by the customer; a stated or detected change in Internet Protocol ("IP") address of at least one call device having a corresponding telephone number associated with the customer; a stated or detected change in at least one E911 address associated with the customer in at least one database maintained by a third party vendor; at least one call device having a corresponding telephone number associated with the customer being set up as a work-from-home call device for an employee of the customer; a determined discrepancy between at least one database maintained by the third party vendor and at least one database maintained by the service provider; a request to update at least one address in the E911 database; results of an E911 address audit for the customer; or whether any changes to at least one address associated with the customer affect any address contained within the set of 911 or E911 address data; and/or the like.

The various embodiments of the 911 or enhanced 911 ("E911") address update method and system enable more direct communication (via APIs, portals, gateways, and/or the like) with the network(s) (and between the network(s) and the E911 database(s) and/or the third party vendor system) to update (and validate) 911 or E911 addresses of a customer. As a result, 911 or E911 address updates or changes may be made in an efficient, low cost, and near-real-time (on the order of minutes or less than half an hour, or so) manner, and such address information may be made consistent (and current or up-to-date) across the service provider database(s), the third party vendor database(s), and the E911 database(s) (thereby avoiding potential life-threatening issues with the wrong E911 address being relayed to first responders by local PSAPs during an emergency). Also, as APIs and similar communications channels are used (compared with manual or in-person calling, verification, and updating, or the like), 911 or E911 address updates may be performed in near-real-time. These and other aspects of the 911 or enhanced 911 ("E911") address update method and system are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, network provisioning technology, network configuration/reconfiguration technology, PSAP technology, E911 address update technology, and/or the like. In other aspects, certain embodiments, can improve the functioning of user equipment or systems themselves (e.g., network provisioning systems, network configuration/reconfiguration systems, PSAP systems, E911 address update systems, etc.), for example, by, in response to a trigger event, determining, using a computing system, whether a set of 911 or enhanced 911 ("E911") address data associated with a customer that is stored in an E911 database requires updating; based on a determination that the set of 911 or E911 address data associated with the customer requires updating, determining, using the computing system, whether any address data associated with the customer is contained in at least one database accessible by the computing system and whether any address data associated with the customer that is contained in the at least one database has been validated or verified, wherein the at least one database is separate from the E911 database; based on a determination that the at least one database contains first address data associated with the customer that has been validated or verified, updating, using the computing system, the E911 database with the first address data associated with the customer that is contained in the at least one database and that has been validated or verified; based on a determination that the at least one database does not contain any address data associated with the customer or that any address data associated with the customer that is contained in the at least one database has not been validated or verified: sending, using the computing system, a message to the customer to provide updated 911 or E911 address data; receiving, using the computing system and from a user device associated with the customer via an application programming interface ("API") over a network operated by a service provider, updated 911 or E911 address data from the customer; and in response to receiving updated 911 or E911 address data from the customer, updating, using the computing system, the E911 database with the received updated 911 or E911 address data from the customer; and/or the like.

In particular, to the extent any abstract concepts are present in the various embodiments, those concepts can be implemented as described herein by devices, software, systems, and methods that involve specific novel functionality (e.g., steps or operations), such as, using trigger-based determinations of whether a customer's 911 or E911 address (es) need be updated, automatically updating an E911 database with accessible (already) validated and verified 911 or E911 address(es) associated with the customer, and, if such is not available, automatically prompting the customer for 911 or E911 address(es), receiving the requested address(es) via an API, and updating the E911 database accordingly, and/or the like, to name a few examples, that extend beyond mere conventional computer processing operations. These functionalities can produce tangible results outside of the implementing computer system, including, merely by way of example, optimized 911 or E911 address updating (and validation) that is performed in an efficient, low cost, and near-real-time (on the order of minutes or less than half an hour, or so) manner, and/or the like, at least some of which may be observed or measured by customers and/or service providers.

In an aspect, a method may comprise, in response to a trigger event, determining, using a computing system, whether a set of 911 or enhanced 911 ("E911") address data associated with a customer that is stored in an E911 database requires updating; based on a determination that the set of 911 or E911 address data associated with the customer requires updating, determining, using the computing system, whether any address data associated with the customer is contained in at least one database accessible by the computing system and whether any address data associated with the customer that is contained in the at least one database has been validated or verified, wherein the at least one database is separate from the E911 database; based on a determination that the at least one database contains first address data associated with the customer that has been validated or verified, updating, using the computing system, the E911 database with the first address data associated with the customer that is contained in the at least one database and that has been validated or verified; based on a determination that the at least one database does not contain any address data associated with the customer or that any address data associated with the customer that is contained in the at least one database has not been validated or verified: sending, using the computing system, a message to the customer to provide updated 911 or E911 address data; receiving, using the computing system and from a user device associated with the customer via an application programming interface ("API") over a network operated by a service provider, updated 911 or E911 address data from the customer; and in response to receiving updated 911 or E911 address data from the customer, updating, using the computing system, the E911 database with the received updated 911 or E911 address data from the customer.

In some embodiments, the computing system may comprise at least one of an API platform computing system, an API gateway, a customer interface server, an E911 address change server, a gateway controller, a network operations center ("NOC"), a cloud computing system, or a distributed computing system, and/or the like.

Merely by way of example, in some cases, the trigger event may comprise one of: receiving an order to add, remove, or change telephone service associated with the customer; receiving an order to relocate at least one call device having a corresponding telephone number associated with the customer from a first area to a second area within a known geographic location associated with the customer; receiving an order to relocate at least one call device having a corresponding associated with the customer from a first area in a first location associated with the customer to a second area in a second location, the second location being in a geographically separate part of a region from the first location, wherein the region comprises one of a neighborhood, a campus, a section of a municipality, an entire municipality, a state, a collection of neighboring states, a country, or a continent; receiving an order to set up at least one work-from-home call device for a corresponding at least one employee of the customer, the at least one work-from-home call device having a corresponding telephone number associated with the customer; receiving a notification that a business telephone directory maintained by the customer has changed; receiving a notification that a telephone number associated with the customer is involved in a session initiation protocol ("SIP")-based communication from a location different from any E911 addresses associated with the customer as stored in the E911 database, based on geo-location data; receiving a notification indicating a change in geo-location data associated with a telephone number associated with the customer that is involved in a SIP-based communication; receiving a notification that a telephone number associated with the customer is involved in a SIP-based communication from a location different from any E911 addresses associated with the customer as stored in the E911 database, based on Internet Protocol ("IP") address data; receiving a notification indicating a change in IP address associated with a telephone number associated with the customer that is involved in a SIP-based communication; receiving a request from the customer to update at least one address in the E911 database; receiving a notification indicating that a third party vendor has changed at least one E911 address associated with the customer in at least one database; or receiving instructions to initiate an E911 address audit for the customer; and/or the like.

In some instances, the geo-location data may comprise one of global positioning system ("GPS") data, assisted GPS ("A-GPS") data, global navigation satellite system ("GLONASS") data, assisted GLONASS ("A-GLONASS") data, Galileo global navigation satellite system ("GNSS") data, BeiDou navigation satellite system ("BDS") data, geographic information system ("GIS") data, geocoded address data, cellular network radiolocation-based data, wireless phase one ("WPH1") location data, or wireless phase two ("WPH2") location data, and/or the like.

According to some embodiments, determining whether the set of 911 or E911 address data associated with the customer requires updating may comprise determining, using the computing system, whether the set of 911 or E911 address data requires updating based on one of: a transfer of telephone service for the customer from an unaffiliated service provider; a stated or detected change in geo-location data of at least one call device having a corresponding telephone number associated with the customer; a change in a business telephone directory maintained by the customer; a stated or detected change in Internet Protocol ("IP") address of at least one call device having a corresponding telephone number associated with the customer; a stated or detected change in at least one E911 address associated with the customer in at least one database maintained by a third party vendor; at least one call device having a corresponding telephone number associated with the customer being set up as a work-from-home call device for an employee of the customer; a determined discrepancy between at least one database maintained by the third party vendor and at least one database maintained by the service provider; a request to update at least one address in the E911 database; results of an E911 address audit for the customer; or whether any changes to at least one address associated with the customer affect any address contained within the set of 911 or E911 address data; and/or the like.

In some cases, in response to the customer initiating a 911 emergency call, the third party vendor may route the 911 emergency call to a local public safety access point ("PSAP") on behalf of the customer or the service provider, wherein the first address data associated with the customer that is contained in the at least one database may be validated or verified by the third party vendor. In some instances, the method may further comprise receiving, using the computing system, a passback of the first address data from the at least one database maintained by the third party vendor; and updating, using the computing system, the one or more address data associated with the customer contained in at least one database maintained by the service provider with the received first address data. Alternatively, or additionally, the method may further comprise mirroring, using the computing system, the first address data associated with the customer contained in the at least one database maintained by the third party vendor and one or more address data associated with the customer contained in at least one database maintained by the service provider.

In some embodiments, one or more of the E911 database or the at least one database each may comprise at least one of an automatic location identification ("ALI") database, a master street address guide ("MSAG"), a United States postal service ("USPS") database, North American 9-1-1 Resource Database, a database associated with the service provider, or a database associated with a third party vendor, and/or the like.

According to some embodiments, receiving the updated 911 or E911 address data from the customer may comprise receiving, using the computing system and via the API over the network, updated 911 or E911 address data from the customer through a user interface ("UI") displayed on the user device associated with the customer, wherein the UI comprises one of a portal-based UI, a webpage UI, or a software application ("app") UI running on the user device, and/or the like. In some instances, the UI may provide the customer with at least one of: one or more options to update, enter, or save at least one E911 address associated with the customer, wherein each E911 address comprises a physical address that is provided to first responders in response to a 911 emergency call being initiated by the customer; one or more options to update, enter, or save at least one primary address associated with the customer, wherein each primary address comprises a street address; one or more options to update, enter, or save at least one secondary address associated with the customer, each secondary address comprises at least one of building number, floor, suite, or office number; one or more options to update, enter, or save at least one service address associated with the customer, wherein each service address comprises one of a physical address at which service is provided to the customer by a service provider associated with one of the computing system or the network or a billing address associated with the customer; one or more options to change at least one trigger event for updating at least one E911 address associated with the customer; one or more options to synchronize at least one E911 address associated with the customer across at least two databases; one or more options to notify the customer in the event of discrepancies in at least one E911 address associated with the customer that are found in two or more databases; one or more options to notify the customer when at least one E911 address associated with the customer has been updated, changed, or deleted; or one or more options to update, enter, or save one or more telephone numbers associated with at least one E911 address associated with the customer; and/or the like.

In some embodiments, the method may further comprise validating, using the computing system, any address associated with the customer that is being added or changed against a standard address format prior to updating the E911 database, wherein the standard address format may comprise one of an automatic location identification ("ALI") database address format, a master street address guide ("MSAG") address format, a United States Postal Service ("USPS") database address format, or North American 9-1-1 Resource Database address format, and/or the like.

Alternatively, or additionally, the method may further comprise receiving, using the computing system and from the user device associated with the customer via the API, a first request to validate at least one address associated with the customer; and in response to receiving the first request, validating, using the computing system, the at least one address against a standard address format, wherein the standard address format may comprise one of an ALI database address format, a MSAG address format, a USPS database address format, or North American 9-1-1 Resource Database address format, and/or the like.

Alternatively, or additionally, the method may further comprise receiving, using the computing system and from the user device associated with the customer via the API, a second request to obtain at least one current address associated with the customer from the E911 database; and in response to receiving the second request, retrieving, using the computing system and from the E911 database, the requested at least one current address, and sending, using the computing system and to the user device, the retrieved at least one current address.

Alternatively, or additionally, the method may further comprise receiving, using the computing system and from the user device associated with the customer via the API, a third request to obtain a list of remote locations associated with a service identifier ("ID") for the customer from a pipeline API; and in response to receiving the third request, retrieving, using the computing system and from the pipeline API, information regarding remote locations associated with the service ID for the customer, compiling, using the computing system, the list of remote locations associated with the service ID for the customer, and sending, using the computing system and to the user device, the compiled list of remote locations.

Alternatively, or additionally, the method may further comprise receiving, using the computing system and from the user device associated with the customer via the API, a fourth request to change at least one address associated with the customer in the E911 database, the fourth request comprising one or more telephone numbers associated with the customer and one or more updated addresses corresponding to each telephone number, each telephone number corresponding to the at least one address; in response to receiving the fourth request, validating, using the computing system, each updated address among the one or more updated addresses in the fourth request; and after the one or more updated addresses have been validated, replacing, using the computing system, the at least one address in the E911 database with the validated one or more updated addresses, and sending, using the computing system and to the user device, a message confirming that the at least one address has been updated with the one or more updated addresses.

Alternatively, or additionally, the method may further comprise receiving, using the computing system and from the user device associated with the customer via the API, a status query regarding an E911 address change request; and in response to receiving the status request, determining, using the computing system, a current status of a process for changing the E911 address associated with the customer, and sending, using the computing system and to the user device, a message indicating the current status of the process for changing the E911 address associated with the customer.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: in response to a trigger event, determine whether a set of 911 or enhanced 911 ("E911") address data associated with a customer that is stored in an E911 database requires updating; based on a determination that the set of 911 or E911 address data associated with the customer requires updating, determine whether any address data associated with the customer is contained in at least one database accessible by the computing system and whether any address data associated with the customer that is contained in the at least one database has been validated or verified, wherein the at least one database is separate from the E911 database; based on a determination that the at least one database contains first address data associated with the customer that has been validated or verified, update the E911 database with the first address data associated with the customer that is contained in the at least one database and that has been validated or verified; based on a determination that the at least one database does not contain any address data associated with the customer or that any address data associated with the customer that is contained in the at least one database has not been validated or verified: send a message to the customer to provide updated 911 or E911 address data; receive, from a user device associated with the customer via an application programming interface ("API") over a network operated by a service provider, updated 911 or E911 address data from the customer; and in response to receiving updated 911 or E911 address data from the customer, update the E911 database with the received updated 911 or E911 address data from the customer.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: in response to a trigger event, determine whether a set of 911 or enhanced 911 ("E911") address data associated with a customer that is stored in an E911 database requires updating; based on a determination that the set of 911 or E911 address data associated with the customer requires updating, determine whether any address data associated with the customer is contained in at least one database accessible by the computing system and whether any address data associated with the customer that is contained in the at least one database has been validated or verified, wherein the at least one database is separate from the E911 database; based on a determination that the at least one database contains first address data associated with the customer that has been validated or verified, update the E911 database with the first address data associated with the customer that is contained in the at least one database and that has been validated or verified; based on a determination that the at least one database does not contain any address data associated with the customer or that any address data associated with the customer that is contained in the at least one database has not been validated or verified: send a message to the customer to provide updated 911 or E911 address data; receive, from a user device associated with the customer via an application programming interface ("API") over a network operated by a service provider, updated 911 or E911 address data from the customer; and in response to receiving updated 911 or E911 address data from the customer, update the E911 database with the received updated 911 or E911 address data from the customer.

In some embodiments, the computing system may comprise at least one of an API platform computing system, an API gateway, a customer interface server, an E911 address change server, a gateway controller, a network operations center ("NOC"), a cloud computing system, or a distributed computing system, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

SPECIFIC EXEMPLARY EMBODIMENTS

We now turn to the embodiments as illustrated by the drawings. FIGS. 1-6 illustrate some of the features of the method, system, and apparatus for implementing public safety service point ("PSAP") operations and functionalities, and, more particularly, to methods, systems, and apparatuses for implementing 911 or enhanced 911 ("E911") address update, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing 911 or enhanced 911 ("E911") address update, in accordance with various embodiments.

In the non-limiting embodiment of FIG. 1, system 100 may comprise a computing system 105 and corresponding database(s) 110 that may be disposed or located within network(s) 115 and/or access network(s) 115a (which may be part of network(s) 115 associated with a first service provider, an extension of network(s) 115, or a different but communicatively coupled network(s) with respect to network(s) 115 (in some cases, associated with a second service provider different from the first service provider), or the like). A customer 120, who may be associated with, or may have service arrangements with the first service provider for, one or more customer locations 125a-125n (collectively, "customer locations 125" or the like), each of which may include, without limitation, at least one of a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, a hospital or other medical facility, a research facility, a university (or other post-secondary) building or buildings within a campus, and/or the like. At the customer location(s) 125, the customer may have, or may be associated with, one or more user devices 130, one or more call devices 135a-135n (collectively, "call devices 135" or the like), and, in some cases, an Internet Protocol private branch exchange(s) ("IP PBX(s)") 140a-140n (collectively, "IP PBX 140" or the like). In some cases, call devices 135a-135x and corresponding IP PBX 140a may be disposed or located at, or assigned to, customer location(s) 125a, while call devices 135y-135n and corresponding IP PBX 140n may be disposed or located at, or assigned to, customer location(s) 125n, and call devices 135x-135y and corresponding IP PBX 140b-140[n-1] may be disposed or located at, or assigned to, customer locations 125b-125[n-1] (not shown).

In some embodiments, the computing system 105 may include, without limitation, at least one of an API platform computing system, an API gateway, a customer interface server, an E911 address change server, a gateway controller, a network operations center ("NOC"), a cloud computing system, or a distributed computing system, and/or the like. In some cases, the one or more user devices 130 may each include, but is limited to, one of a desktop computer, a laptop computer, a tablet computer, a smart phone, a mobile phone, or any suitable device capable of communicating with computing system 105 via a web-based portal, an application programming interface ("API"), a server, a software application ("app"), or any other suitable communications interface, or the like. In some instances, the one or more call devices 135 may each include, without limitation, one of a voice over Internet Protocol ("VoIP")-capable wired telephone, a desktop computer with VoIP communications software or app, a laptop computer with VoIP communications software or app, a tablet computer with VoIP communications software or app, a smart phone with VoIP communications software or app, a mobile phone with VoIP communications software or app, or any other suitable call device with VoIP communications software or app, or the like. In some cases, at least one user device 130 may overlap with, or may be the same as, at least one call device 135. Alternatively, or additionally, at least one other user device 130 may be different from at least one other call device 135 (which, in such cases, may be a dedicated call device, or the like). In some instances, the IP PBX 140 may comprise a VoIP gateway, and in some cases may connect telephone extensions to a public switched telephone network ("PSTN") while providing internal communication among the call devices 135. The call devices 135 may communicatively couple with the corresponding IP PBX 140 over wired or wireless connections within customer location(s) 125. Alternatively, the at least one call device 135 may communicatively couple with network(s) 115 and/or 115a without routing through the corresponding IP PBX 140 (i.e., by communicatively coupling directly with router(s) 160, or the like).

According to some embodiments, system 100 may further comprise at least one of gateway 145a, portal 145b, and/or API 145c, in some cases, disposed or located within access network(s) 115a or the like. In some instances, computing system 105 may communicatively couple with each of the at least one of gateway 145a, portal 145b, and/or API 145c, either directly or indirectly. System 100 may further comprise a service provider address database(s) 150, an address validation engine 155, and a plurality of nodes or routers 160, each of which may be disposed in network(s) 115 and/or 115a. The service provider address database(s) 150 may be configured to store customer information, including, but not limited to, its copy of each customer's 911 or E911 address, or the like. The address validation engine 155 may be configured to validate a customer's 911 or E911 address that is being added or changed, in some cases, against a standard address format, including, but not limited to, one of an automatic location identification ("ALI") database address format, a master street address guide ("MSAG") address format, a United States Postal Service ("USPS") database address format, or North American 9-1-1 Resource Database address format, and/or the like. The plurality of routers 160 is configured to route and/or establish session initiation protocol ("SIP")-based communication sessions throughout the network(s) 115 and/or 115a. In some cases, each SIP-based communication may include, without limitation, at least one of a VoIP call, an IP-based video call, or an instant message over IP, and/or the like.

In some embodiments, system 100 may further comprise a third party vendor system or server 165 and corresponding third party vendor database(s) 170, which may both be disposed within a third party vendor network(s) 115b (which, like network(s) 115a, may be part of network(s) 115 associated with a first service provider, an extension of network(s) 115, or a different but communicatively coupled network(s) with respect to network(s) 115 (in some cases, associated with a third service provider different from the first service provider), or the like). According to some embodiments, system 100 may further comprise one or more public safety access points ("PSAPs") 175a-175n (collectively, "PSAPs 175" or the like) and corresponding E911 database(s) 180, which may both be disposed within a PSAP network(s) 115c (which, like network(s) 115a, may be part of network(s) 115 associated with a first service provider, an extension of network(s) 115, or a different but communicatively coupled network(s) with respect to network(s) 115 (in some cases, associated with a fourth service provider different from the first service provider), or the like). In some embodiments, one or more of the address database(s) 150, the third party vendor database(s) 170, and/or the E911 database(s) 180 may each include, without limitation, at least one of an ALI database, a MSAG, a USPS database, or North American 9-1-1 Resource Database, and/or the like.

The third party vendor, using the third party vendor server or system 165, may be configured to, in response to the customer initiating a 911 emergency call, route the 911 emergency call to a local PSAP 175 among the one or more PSAPs 175 on behalf of the customer or the service provider. The third party vendor, using the third party vendor server or system 165, may also be configured to validate or verify 911 or E911 addresses of the customer 120, in some cases, against a standard address format, including, but not limited to, one of an ALI database address format, a MSAG address format, a USPS database address format, or North American 9-1-1 Resource Database address format, and/or the like. The third party vendor, using the third party vendor server or system 165, may further be configured to update one or more PSAPs 175 and/or the E911 database(s) 180. The third party vendor database(s) 170 may be configured to store customer information, including, but not limited to, its copy of each customer's 911 or E911 address, or the like. The E911 database(s) 180 may be configured to store customer addresses that would be relied upon and used by local PSAPs 175 when dispatching first responders (e.g., law enforcement units, firefighting units, and/or paramedic units, or the like) to the customer location(s) 125a-125n.

According to some embodiments, network(s) 115, access network(s) 115a, third party vendor network(s) 115b, and/or PSAP network(s) 115c may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 115, 115a, 115b, and/or 115c may each include an access network of the service provider (e.g., an Internet service provider ("ISP")). In another embodiment, the network(s) 115, 115a, 115b, and/or 115c may each include a core network of the service provider and/or the Internet.

In operation, in response to a trigger event, computing system 105 may determine whether a set of 911 or enhanced 911 ("E911") address data associated with a customer that is stored in an E911 database requires updating. Based on a determination that the set of 911 or E911 address data associated with the customer requires updating, the computing system 105 may determine whether any address data associated with the customer is contained in at least one database accessible by the computing system and whether any address data associated with the customer that is contained in the at least one database (e.g., service provide address database(s) 150 and/or third party vendor database(s) 170, or the like) has been validated or verified, where the at least one database is separate from the E911 database(s) 180. Based on a determination that the at least one database contains first address data associated with the customer that has been validated or verified, the computing system 105 may update the E911 database with the first address data associated with the customer that is contained in the at least one database and that has been validated or verified.

Based on a determination that the at least one database does not contain any address data associated with the customer 120 or that any address data associated with the customer 120 that is contained in the at least one database has not been validated or verified, the computing system 105 may send a message to the customer to provide updated 911 or E911 address data; may receive, from a user device associated with the customer via gateway 145a, portal 145b, and/or API 145c over a network(s) 115 and/or 115a operated by the service provider, updated 911 or E911 address data from the customer 120; and in response to receiving updated 911 or E911 address data from the customer 120, may update the E911 database 180 with the received updated 911 or E911 address data from the customer 120.

According to some embodiments, the trigger event may include, but is not limited to, one of: receiving an order (in the form of request 190, or the like) to add, remove, or change telephone service associated with the customer; receiving an order (in the form of request 190, or the like) to relocate at least one call device having a corresponding telephone number associated with the customer from a first area to a second area within a known geographic location associated with the customer; receiving an order (in the form of request 190, or the like) to relocate at least one call device having a corresponding associated with the customer from a first area in a first location associated with the customer to a second area in a second location, the second location being in a geographically separate part of a region from the first location, wherein the region comprises one of a neighborhood, a campus, a section of a municipality, an entire municipality, a state, a collection of neighboring states, a country, or a continent; receiving an order to set up at least one work-from-home call device for a corresponding at least one employee of the customer, the at least one work-from-home call device having a corresponding telephone number associated with the customer; receiving a notification that a business telephone directory maintained by the customer has changed; receiving a notification that a telephone number associated with the customer is involved in a session initiation protocol ("SIP")-based communication from a location different from any E911 addresses associated with the customer as stored in the E911 database, based on geo-location data; receiving a notification indicating a change in geo-location data associated with a telephone number associated with the customer that is involved in a SIP-based communication; receiving a notification that a telephone number associated with the customer is involved in a SIP-based communication from a location different from any E911 addresses associated with the customer as stored in the E911 database, based on Internet Protocol ("IP") address data; receiving a notification indicating a change in IP address associated with a telephone number associated with the customer that is involved in a SIP-based communication; receiving a request from the customer to update at least one address in the E911 database; receiving a notification indicating that a third party vendor has changed at least one E911 address associated with the customer in at least one database; or receiving instructions to initiate an E911 address audit for the customer; and/or the like.

In some cases, the geo-location data—which may be provided to user device(s) 130 and/or call device(s) 135a-135n from a geo-location source such as geo-location system 185, or the like—may include, without limitation, one of global positioning system ("GPS") data, assisted GPS ("A-GPS") data, global navigation satellite system ("GLONASS") data, assisted GLONASS ("A-GLONASS") data, Galileo global navigation satellite system ("GNSS") data, BeiDou navigation satellite system ("BDS") data, geographic information system ("GIS") data, geocoded address data, cellular network radiolocation-based data, wireless phase one ("WPH1") location data, or wireless phase two ("WPH2") location data, and/or the like.

In some embodiments, determining whether the set of 911 or E911 address data associated with the customer requires updating may comprise determining whether the set of 911 or E911 address data requires updating based on one of: a transfer of telephone service for the customer from an unaffiliated service provider; a stated or detected change in geo-location data of at least one call device having a corresponding telephone number associated with the customer; a change in a business telephone directory maintained by the customer; a stated or detected change in Internet Protocol ("IP") address of at least one call device having a corresponding telephone number associated with the customer; a stated or detected change in at least one E911 address associated with the customer in at least one database maintained by a third party vendor; at least one call device having a corresponding telephone number associated with the customer being set up as a work-from-home call device for an employee of the customer; a determined discrepancy between at least one database maintained by the third party vendor and at least one database maintained by the service provider; a request to update at least one address in the E911 database; results of an E911 address audit for the customer; or whether any changes to at least one address associated with the customer affect any address contained within the set of 911 or E911 address data; and/or the like.

According to some embodiments, the computing system 105 may receive a passback (or transfer) of the first address data from the at least one database maintained by the third party vendor (e.g., third party vendor database(s) 170, in some cases, via router(s) 160 and third party vendor system 165, or the like). The computing system 105 may then update the one or more address data associated with the customer contained in at least one database maintained by the service provider (e.g., address database(s) 150, or the like) with the received first address data. Alternatively, or additionally, the computing system 105 may mirror the first address data associated with the customer contained in the at least one database maintained by the third party vendor (e.g., third party vendor database(s) 170, in some cases, accessible via router(s) 160 and third party vendor system 165, or the like) and one or more address data associated with the customer contained in at least one database maintained by the service provider (e.g., address database(s) 150, or the like).

In some embodiments, receiving the updated 911 or E911 address data from the customer may comprise receiving, via gateway 145a, portal 145b, and/or API 145c over the network(s) 115 and/or 115a, updated 911 or E911 address data from the customer through a user interface ("UI") displayed on the user device(s) 130 associated with the customer 120, where the UI may include, but is not limited to, one of a portal-based UI, a webpage UI, or a software application ("app") UI running on the user device(s) 130. Merely by way of example, in some cases, the UI may provide the customer 120 with at least one of: one or more options to update, enter, or save at least one E911 address associated with the customer, wherein each E911 address comprises a physical address that is provided to first responders in response to a 911 emergency call being initiated by the customer; one or more options to update, enter, or save at least one primary address associated with the customer, wherein each primary address comprises a street address; one or more options to update, enter, or save at least one secondary address associated with the customer, each secondary address comprises at least one of building number, floor, suite, or office number; one or more options to update, enter, or save at least one service address associated with the customer, wherein each service address comprises one of a physical address at which service is provided to the customer by a service provider associated with one of the computing system or the network or a billing address associated with the customer; one or more options to change at least one trigger event for updating at least one E911 address associated with the customer; one or more options to synchronize at least one E911 address associated with the customer across at least two databases; one or more options to notify the customer in the event of discrepancies in at least one E911 address associated with the customer that are found in two or more databases; one or more options to notify the customer when at least one E911 address associated with the customer has been updated, changed, or deleted; or one or more options to update, enter, or save one or more telephone numbers associated with at least one E911 address associated with the customer; and/or the like.

According to some embodiments, the computing system 105 may receive, from the user device associated with the customer 120 via gateway 145a, portal 145b, and/or API 145c, a first request to validate at least one address associated with the customer 120. The computing system 105, using address validation engine 155, may validate—either in response to receiving the first request or based on other triggers or rules on a periodic or sporadic manner, etc.—the at least one address against a standard address format, as described above.

Alternatively, or additionally, the computing system 105 may receive, from the user device associated with the customer 120 via gateway 145a, portal 145b, and/or API 145c, a second request to obtain at least one current address associated with the customer 120 from the E911 database(s) 180. In response to receiving the second request, the computing system 105 may retrieve, from the E911 database(s) 180, the requested at least one current address, and may send, to the user device(s) 130 (in some cases, via gateway 145a, portal 145b, and/or API 145c; or via e-mail, text message, etc.), the retrieved at least one current address.

Figure 2A:
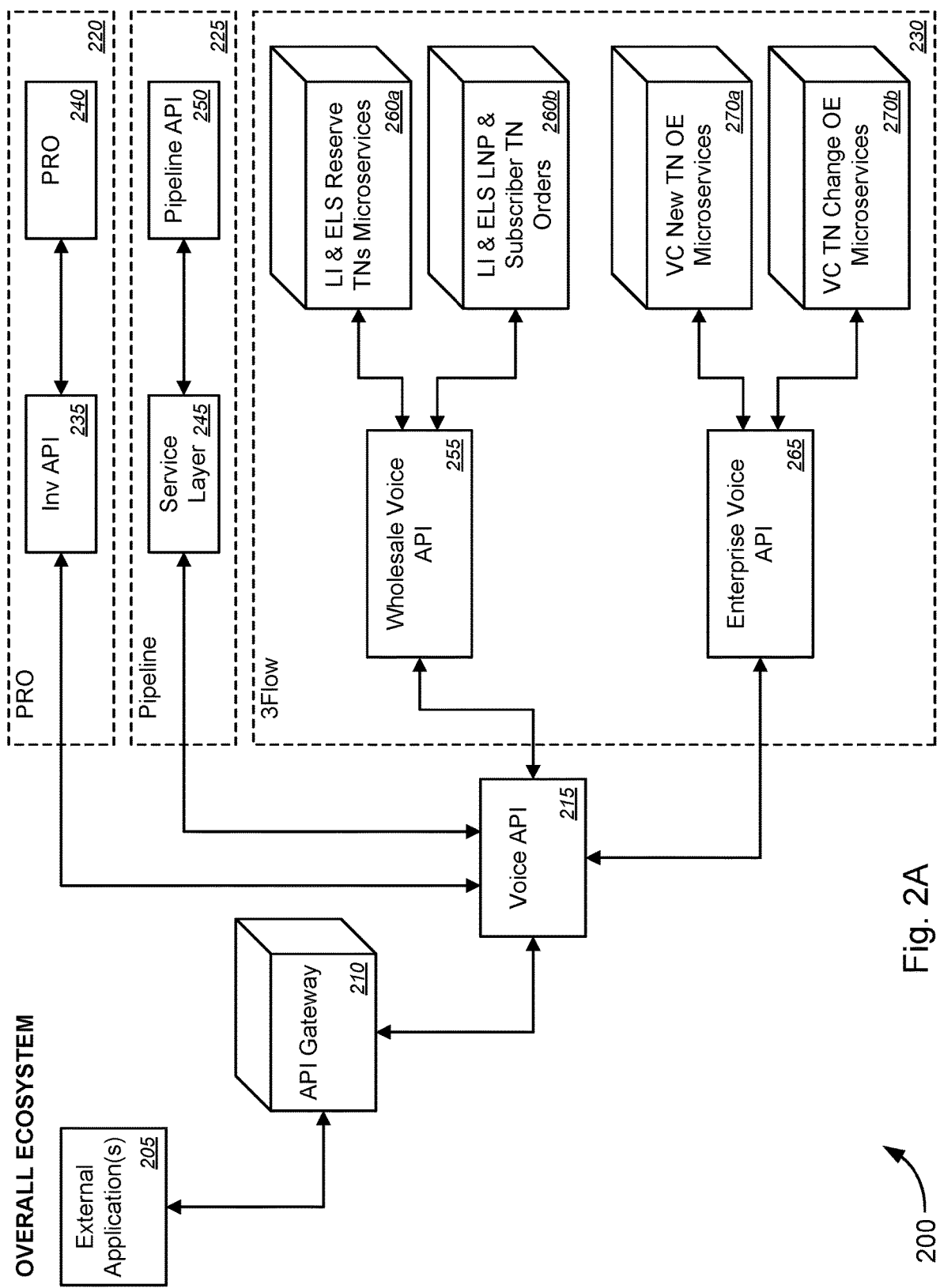
FIGS. 2A and 2B are block flow diagrams illustrating a non-limiting example of an ecosystem and portions thereof that may be used for implementing 911 or E911 address update, in accordance with various embodiments.
Figure 2B:
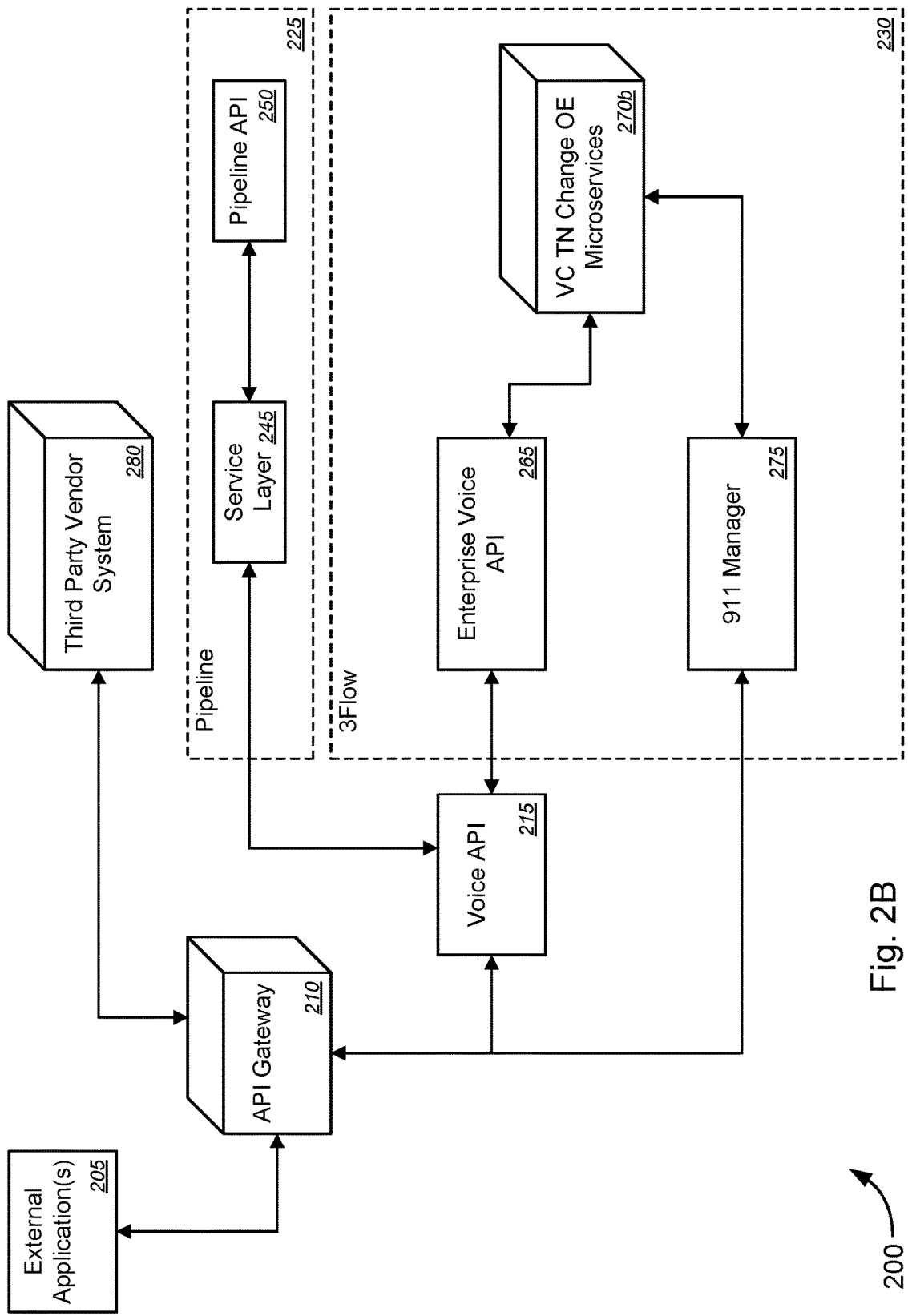

Alternatively, or additionally, the computing system 105 may receive, from the user device associated with the customer 120 via gateway 145a, portal 145b, and/or API 145c, a third request to obtain a list of remote locations associated with a service identifier ("ID") for the customer 120 from a pipeline API (shown in FIGS. 2A and 2B). In response to receiving the third request, the computing system 105 may retrieve, from the pipeline API, information regarding remote locations associated with the service ID for the customer 120, may compile the list of remote locations associated with the service ID for the customer, and may send, to the user device(s) 130 (in some cases, via gateway 145a, portal 145b, and/or API 145c; or via e-mail, text message, etc.), the compiled list of remote locations.

Alternatively, or additionally, the computing system 105 may receive, from the user device associated with the customer 120 via gateway 145a, portal 145b, and/or API 145c, a fourth request to change at least one address associated with the customer 120 in the E911 database(s) 180, the fourth request comprising one or more telephone numbers associated with the customer and one or more updated addresses corresponding to each telephone number, each telephone number corresponding to the at least one address. In response to receiving the fourth request, the computing system 105 may validate each updated address among the one or more updated addresses in the fourth request, using address validation engine 155 and in a manner as described above. After the one or more updated addresses have been validated, the computing system 105 may replace the at least one address in the E911 database(s) 180 with the validated one or more updated addresses, and may send, to the user device(s) 130 (in some cases, via gateway 145a, portal 145b, and/or API 145c; or via e-mail, text message, etc.), a message confirming that the at least one address has been updated with the one or more updated addresses.

Alternatively, or additionally, the computing system 105 may receive, from the user device associated with the customer 120 via gateway 145a, portal 145b, and/or API 145c, a status query regarding an E911 address change request. In response to receiving the status query, the computing system 105 may determine a current status of a process for changing the E911 address associated with the customer 120, and may send, to the user device(s) 130 (in some cases, via gateway 145a, portal 145b, and/or API 145c; or via e-mail, text message, etc.), a message indicating the current status of the process for changing the E911 address associated with the customer 120.

As APIs and similar communications channels are used (compared with manual or in-person calling, verification, and updating, or the like), 911 or E911 address updates may be performed in near-real-time. These and other functions of the system 100 (and its components) are described in greater detail below with respect to FIGS. 2-4.

FIGS. 2A and 2B (collectively, "FIG. 2") are block flow diagrams illustrating a non-limiting example 200 of an ecosystem and portions thereof that may be used for implementing 911 or E911 address update, in accordance with various embodiments. FIG. 2 is intended to provide a different perspective with respect to the ecosystem (FIG. 2A) and the portions of the ecosystem for processing E911 address update (FIG. 2B), and is not limited to such functionalities, but may be applicable to some (if not all) of the functionalities described above with respect to FIG. 1, or the like.

With reference to the non-limiting example 200 of FIG. 2A, an overall ecosystem may comprise external application(s) 205 (which may correspond to application(s) used by the customer 120, third party partners, or third party vendors, or the like), an API gateway 210 (which may correspond to gateway 145a, or the like; and which provides authentication and authorization functionality, or the like), voice API 215 (which may correspond to API 145c, or the like), and various portions 220-230, including, but not limited to, a network provisioning portion 220 (referred to herein as "PRO" portion 220, or the like), a pipeline portion 225, a legacy portion 230 (referred to herein as "3Flow" or the like), etc. According to some embodiments, the voice API or voice API layer 215 may be configured to validate customers and/or to orchestrate requests and responses with other systems.

In some embodiments, the PRO portion 220 may comprise an inventory API 235 and a PRO database 240. By providing a service ID, a customer may communicate with the voice API 215 (via external application(s) 205 and API gateway 210) to query PRO database 240 (in some cases, using a GET command, or the like) via inventory API 235 for administration information (e.g., inventory data, etc.) and/or route plan names, and/or the like.

According to some embodiments, the pipeline portion 225 may comprise service layer 245 and a pipeline API 250. By providing a service ID, a customer may communicate with the voice API 215 (via external application(s) 205 and API gateway 210) to query pipeline API 250 (in some cases, using a GET command, or the like) via service layer 245 for a remote location list, or the like.

In some embodiments, the legacy portion 230 may comprise a wholesale voice API 255, a local inbound and enhanced local services ("LI & ELS") reserve telephone number ("TN") microservices system 260a, and an "LI & ELS" local number porting ("LNP") & subscriber TN orders microservices system 260b. By providing state or rate center number of telephone numbers ("State/RC # of TNs"), a customer may communicate with the voice API 215 (via external application(s) 205 and API gateway 210) to send a request to one or more of wholesale voice API 255 and/or microservices system 260a or 260b to reserve one or more TNs, with a response or output including messages and an array of TNs reserved. Alternatively, or additionally, the legacy portion 230 may further comprise an enterprise voice API 265, a new telephone number order entry (such as a Voice Complete® new telephone number order entry ("VC New TN OE" or the like)) microservices system 270a, and a telephone number change order entry (such as a Voice Complete® telephone number change order entry ("VC TN Change OE" or the like)) microservices system 270b. By providing a number of TNs desired per remote location, a customer may communicate with the voice API 215 (via external application(s) 205 and API gateway 210) to send a request to one or more of enterprise voice API 265 and/or microservices system 270b to order new TNs, with a response or output including messages and an order confirmation with TN details. By providing TNs and addresses, a customer may communicate with the voice API 215 (via external application(s) 205 and API gateway 210) to send a request to one or more of enterprise voice API 265 and/or microservices system 270b to change 911 and location information, with a response or output including messages and an order confirmation. According to some embodiments, the wholesale voice API 255 and the enterprise voice API 265 may be configured to act as, and/or to perform functionalities of, an orchestrator to their respective microservices systems 260a-260b and 270a-270b.

Although not shown, authentication functionality—including, but not limited to, using SSL and/or token-based authentication, or the like—may be implemented to implement database encryption and/or internal network encryption, or the like.

Turning to FIG. 2B, a portion of the ecosystem of FIG. 2A is shown together with extended portions beyond the pipeline portion 225 for processing E911 address update requests. This portion of the ecosystem may provide services, including, but not limited to, getting or obtaining a current 911 address associated with a customer and/or associated with a telephone number ("TN"), MSAG validating a customer address(es), getting or obtaining a list of existing remote locations (e.g., pipelines) associated with a service ID (e.g., a service ID associated with the customer, or the like), submitting one or more TNs to change 911 address associated with the customer or to change the remote location (both with returned messaging, or the like), and/or the like.

For instance, by providing a service ID, a customer may communicate with the voice API 215 (via external application(s) 205 and API gateway 210) to query pipeline API 250 via service layer 245 for a list of remote locations, or the like. Alternatively, or additionally, by providing a TN list, a customer may communicate with the voice API 215 (via external application(s) 205 and API gateway 210) to send a request to enterprise voice API 265 to query 911 manager 275 via microservices 270b for a current 911 address associated with the customer and/or associated with TN. Alternatively, or additionally, by providing a TN array, a customer may communicate with the voice API 215 (via external application(s) 205 and API gateway 210) to send a request to enterprise voice API 265 to validate (e.g., against MSAG data, or the like) customer 911 addresses corresponding to the TN array, in some cases, using 911 manager 275 via microservices 270b, or the like. Alternatively, or additionally, by providing TNs and corresponding addresses, a customer may communicate with the voice API 215 (via external application(s) 205 and API gateway 210) to send a request to enterprise voice API 265 to update 911 manager 275 via microservices 270b with the 911 address associated with the customer and/or associated with the TNs based on the provided TNs and corresponding addresses.

In some embodiments, rather than the customer initiating or performing these actions, a third party vendor, using third party vendor system 280, may initiate or perform these actions. For instance, by providing a service ID, the third party vendor may communicate with the voice API 215 (via third party vendor system 280 and API gateway 210) to query pipeline API 250 via service layer 245 for a list of remote locations, or the like. Alternatively, or additionally, by providing a TN list, the third party vendor may communicate with the voice API 215 (via third party vendor system 280 and API gateway 210) to send a request to enterprise voice API 265 to query 911 manager 275 via microservices 270b for a current 911 address associated with the customer and/or associated with TN. Alternatively, or additionally, by providing a TN array, the third party vendor may communicate with the voice API 215 (via third party vendor system 280 and API gateway 210) to send a request to enterprise voice API 265 to validate (e.g., against MSAG data, or the like) customer 911 addresses corresponding to the TN array, in some cases, using 911 manager 275 via microservices 270b, or the like. Alternatively, or additionally, by providing TNs and corresponding addresses, the third party vendor may communicate with the voice API 215 (via third party vendor system 280 and API gateway 210) to send a request to enterprise voice API 265 to update 911 manager 275 via microservices 270b with the 911 address associated with the customer and/or associated with the TNs based on the provided TNs and corresponding addresses.

Figure 3:
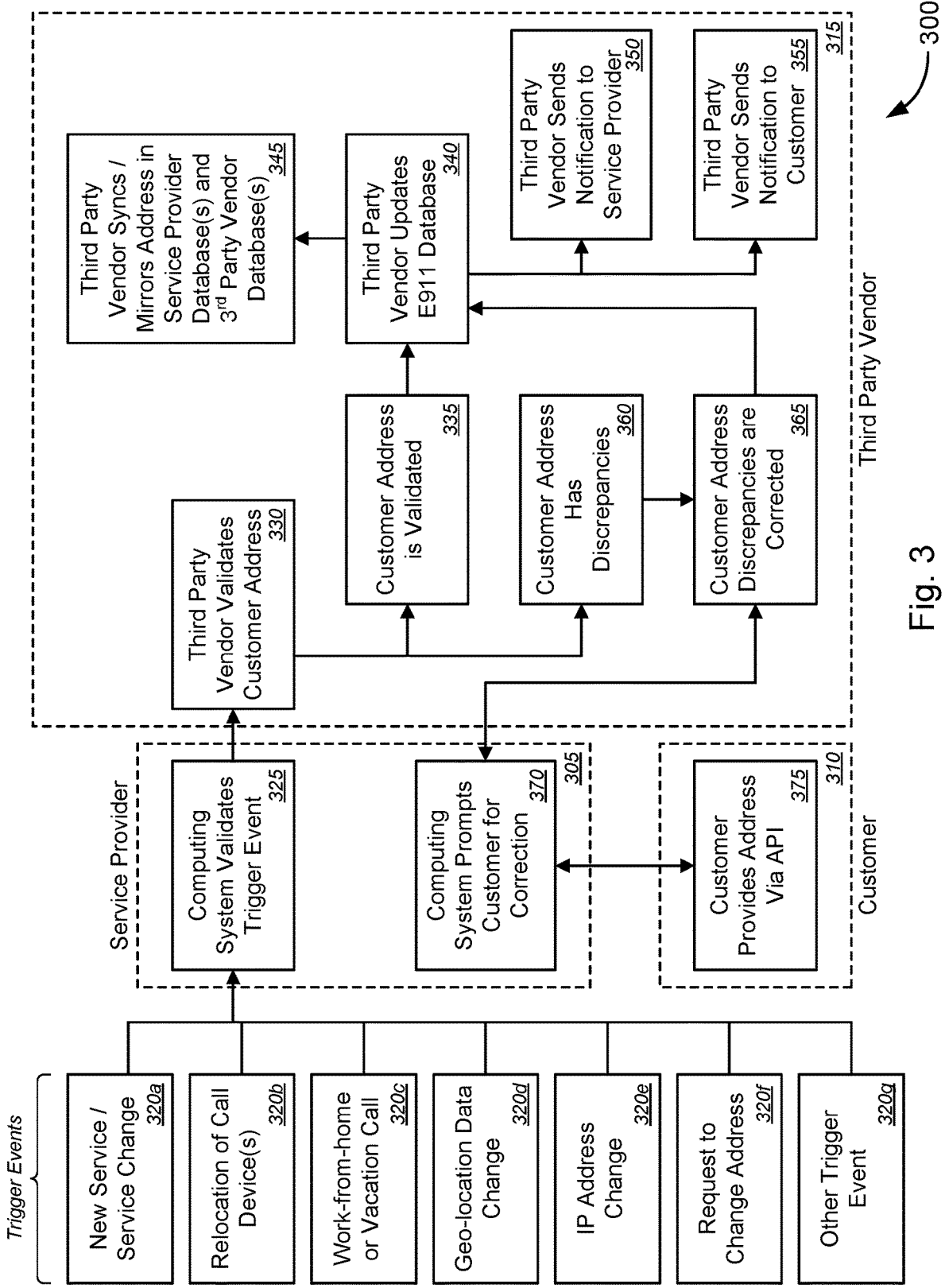
FIG. 3 is a system flow diagram illustrating a non-limiting example of a method for implementing 911 or E911 address update, in accordance with various embodiments.

FIG. 3 is a system flow diagram illustrating a non-limiting example 300 of a method for implementing 911 or E911 address update, in accordance with various embodiments. FIG. 3 depicts some non-limiting interactions among a service provider 305, a customer 310, and a third party vendor 315. Herein, as above, the service provider 305 is an entity that provides telephone service (including 911 or E911 call service, or the like) to the customer 310 (including individual customers, business or corporate customers, institutions, etc.), in some cases, using the third party vendor 315 (which may be a local service provider or a service provider with access to local public safety access points ("PSAPs") that are close to the customer 310, or the like) to route 911 emergency calls to a local PSAP on behalf of the customer 310 and/or the service provider 305 in response to the customer 310 initiating a 911 emergency call.

In some embodiments, implementing 911 or E911 address update may occur in response to a trigger event, which may include, but is not limited to, one of: a new service or a service change 320a; a relocation of call device(s) 320b; a work-from-home or vacation call 320c; a geo-location data change 320d; an Internet Protocol ("IP") address change 320e; a request to change address 320f; or other trigger event 320g; and/or the like (collectively, "trigger events 320" or the like).

The new service or service change trigger event 320a may include, but is not limited to, receiving an order from a new customer to start a new service; receiving an order from a customer to transfer service from another service provider; receiving an order to add, remove, or change telephone service associated with the customer; or the like.

The relocation of call device(s) trigger event 320b may include, without limitation, receiving an order to relocate at least one call device having a corresponding telephone number associated with the customer from a first area to a second area within a known geographic location associated with the customer; receiving an order to relocate at least one call device having a corresponding associated with the customer from a first area in a first location associated with the customer to a second area in a second location, the second location being in a geographically separate part of a region from the first location, wherein the region comprises one of a neighborhood, a campus, a section of a municipality, an entire municipality, a state, a collection of neighboring states, a country, or a continent; or the like.

The work-from-home or vacation call trigger event 320c may include, but is not limited to, receiving an order to set up at least one work-from-home call device for a corresponding at least one employee of the customer, the at least one work-from-home call device having a corresponding telephone number associated with the customer; receiving an order to set up at least one call device to enable vacation calls for a corresponding at least one employee of the customer; and/or the like.

The geo-location data change trigger event 320d may include, without limitation, receiving a notification that a telephone number associated with the customer is involved in a session initiation protocol ("SIP")-based communication from a location different from any E911 addresses associated with the customer as stored in the E911 database, based on geo-location data; receiving a notification indicating a change in geo-location data associated with a telephone number associated with the customer that is involved in a SIP-based communication; and/or the like.

The IP address change trigger event 320e may include, but is not limited to, receiving a notification that a telephone number associated with the customer is involved in a SIP-based communication from a location different from any E911 addresses associated with the customer as stored in the E911 database, based on Internet Protocol ("IP") address data; receiving a notification indicating a change in IP address associated with a telephone number associated with the customer that is involved in a SIP-based communication; and/or the like.

The request to change address trigger event 320f may include, without limitation, receiving a request from the customer to update at least one address in the E911 database; and/or the like. The other trigger events 320g may include, but are not limited to, receiving a notification that a business telephone directory maintained by the customer has changed; receiving a notification indicating that a third party vendor has changed at least one E911 address associated with the customer in at least one database; or receiving instructions to initiate an E911 address audit for the customer; and/or the like.

In response to one of the trigger events 320, the service provider may validate the trigger event (at block 325), e.g., by determining whether or not a customer address that may be stored in an E911 database requires adding or updating. If so, the third party vendor 315 validates the customer address (at block 330), in some cases, by validating against a standard address format, including, but not limited to, one of an automatic location identification ("ALI") database address format, a master street address guide ("MSAG") address format, a United States Postal Service ("USPS") database address format, or North American 9-1-1 Resource Database address format, and/or the like.

In the case that the customer address is validated (at block 335), the third party vendor 315 updates the E911 database (at block 340). In some instances, the third party vendor 315 may synchronize or mirror the customer address in the service provider database(s) and in the third party vendor database(s) (at block 345). When the customer address has been updated or otherwise changed in one or more of the E911 database, the service provider database(s), and/or the third party vendor database(s), the third party vendor 315 may send notifications to the service provider 305 (at block 350) and/or to the customer 310 (at block 355).

On the other hand, in the case that the customer address has discrepancies (e.g., two or more of the customer's mailing address, the customer's MSAG address, and/or the customer's address in the E911 database, and/or the like) (at block 360), the customer address discrepancies may be corrected (at block 365), by having the computing system of the service provider 305 prompt the customer 305 for correction (at block 370). In response to the customer 310 providing the address via an application programming interface ("API") (and/or via a portal, or the like) over a network operated by the service provider 305 (at block 375), the third party vendor 315 may update the E911 database (at block 340), and the processes at blocks 345-355 may be repeated.

FIGS. 4A-4I (collectively, "FIG. 4") are flow diagrams illustrating a method 400 for implementing 911 or E911 address update, in accordance with various embodiments. Method 400 of FIG. 4A continues onto FIG. 4B following the circular marker denoted, "A" or "C," and returns to FIG. 4A following the circular marker denoted, "B" or "D." Method 400 of FIG. 4A alternatively continues onto FIG. 4C or FIG. 4D following the circular marker denoted, "A," and returns to FIG. 4A following the circular marker denoted, "B." Method 400 of FIG. 4A also continues onto FIG. 4E following the circular marker denoted, "E."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

Figure 4A:
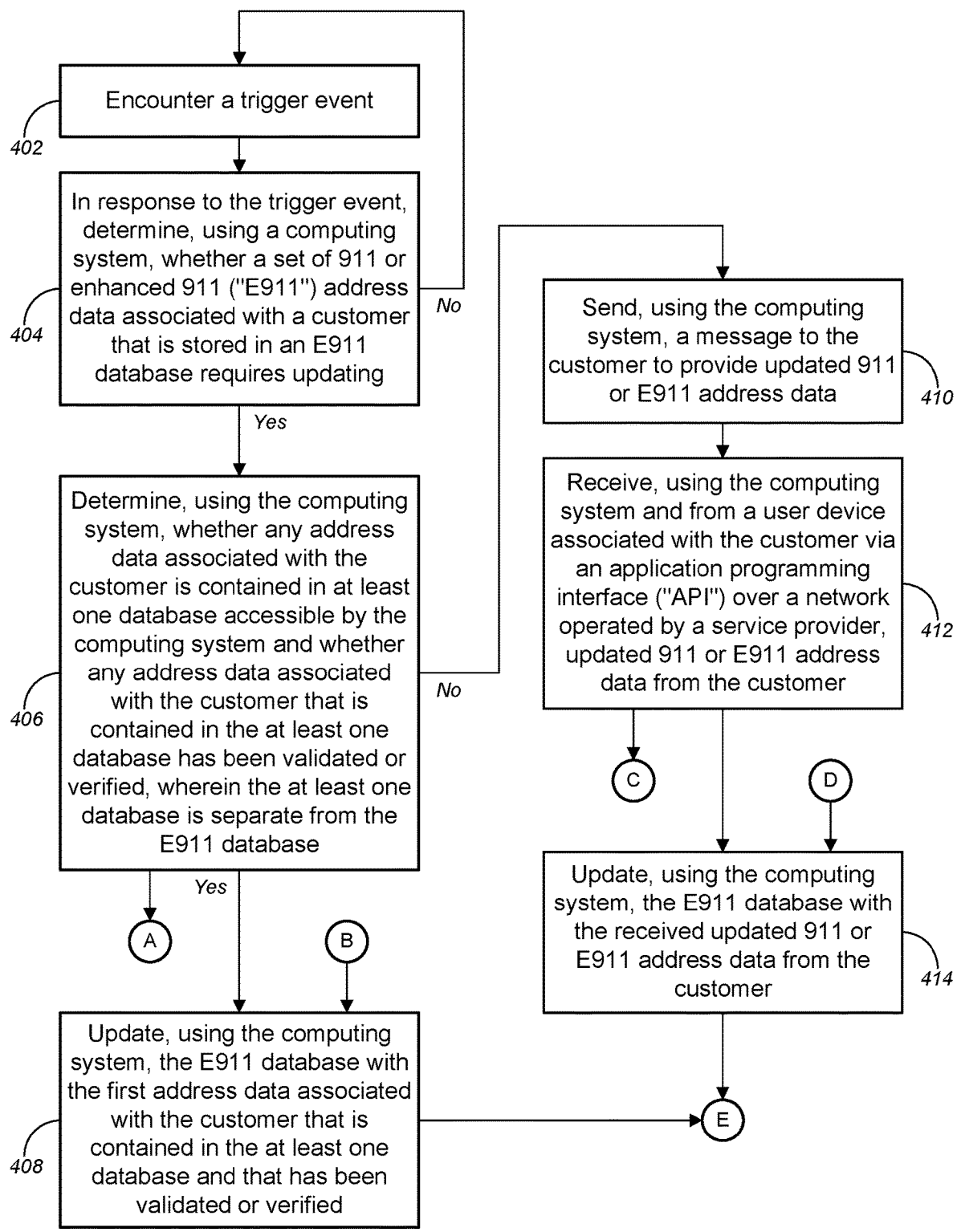

In the non-limiting embodiment of FIG. 4A, method 400, at block 402, may comprise encountering a trigger event. At block 404, method 400 may comprise, in response to the trigger event, determining, using a computing system, whether a set of 911 or enhanced 911 ("E911") address data associated with a customer that is stored in an E911 database requires updating. If so, method 400 may continue onto the process at block 406. If not, method 400 may return to the process at block 402 if and when it encounters another trigger event.

In some embodiments, the computing system may include, without limitation, at least one of an API platform computing system, an API gateway, a customer interface server, an E911 address change server, a gateway controller, a network operations center ("NOC"), a cloud computing system, or a distributed computing system, and/or the like.

According to some embodiments, the trigger event may include, but is not limited to, one of: receiving an order to add, remove, or change telephone service associated with the customer; receiving an order to relocate at least one call device having a corresponding telephone number associated with the customer from a first area to a second area within a known geographic location associated with the customer; receiving an order to relocate at least one call device having a corresponding associated with the customer from a first area in a first location associated with the customer to a second area in a second location, the second location being in a geographically separate part of a region from the first location, wherein the region comprises one of a neighborhood, a campus, a section of a municipality, an entire municipality, a state, a collection of neighboring states, a country, or a continent; receiving an order to set up at least one work-from-home call device for a corresponding at least one employee of the customer, the at least one work-from-home call device having a corresponding telephone number associated with the customer; receiving a notification that a business telephone directory maintained by the customer has changed; receiving a notification that a telephone number associated with the customer is involved in a session initiation protocol ("SIP")-based communication from a location different from any E911 addresses associated with the customer as stored in the E911 database, based on geo-location data; receiving a notification indicating a change in geo-location data associated with a telephone number associated with the customer that is involved in a SIP-based communication; receiving a notification that a telephone number associated with the customer is involved in a SIP-based communication from a location different from any E911 addresses associated with the customer as stored in the E911 database, based on Internet Protocol ("IP") address data; receiving a notification indicating a change in IP address associated with a telephone number associated with the customer that is involved in a SIP-based communication; receiving a request from the customer to update at least one address in the E911 database; receiving a notification indicating that a third party vendor has changed at least one E911 address associated with the customer in at least one database; or receiving instructions to initiate an E911 address audit for the customer; and/or the like.

In some cases, the geo-location data may include, without limitation, one of global positioning system ("GPS") data, assisted GPS ("A-GPS") data, global navigation satellite system ("GLONASS") data, assisted GLONASS ("A-GLO-NASS") data, Galileo global navigation satellite system ("GNSS") data, BeiDou navigation satellite system ("BDS") data, geographic information system ("GIS") data, geocoded address data, cellular network radiolocation-based data, wireless phase one ("WPH1") location data, or wireless phase two ("WPH2") location data, and/or the like.

In some embodiments, determining whether the set of 911 or E911 address data associated with the customer requires updating may comprise determining, using the computing system, whether the set of 911 or E911 address data requires updating based on one of: a transfer of telephone service for the customer from an unaffiliated service provider; a stated or detected change in geo-location data of at least one call device having a corresponding telephone number associated with the customer; a change in a business telephone directory maintained by the customer; a stated or detected change in Internet Protocol ("IP") address of at least one call device having a corresponding telephone number associated with the customer; a stated or detected change in at least one E911 address associated with the customer in at least one database maintained by a third party vendor; at least one call device having a corresponding telephone number associated with the customer being set up as a work-from-home call device for an employee of the customer; a determined discrepancy between at least one database maintained by the third party vendor and at least one database maintained by the service provider; a request to update at least one address in the E911 database; results of an E911 address audit for the customer; or whether any changes to at least one address associated with the customer affect any address contained within the set of 911 or E911 address data; and/or the like.

In some instances, in response to the customer initiating a 911 emergency call, the third party vendor may route the 911 emergency call to a local public safety access point ("PSAP") on behalf of the customer or the service provider, wherein the first address data associated with the customer that is contained in the at least one database may be validated or verified by the third party vendor. In some cases, one or more of the E911 database or the at least one database each may include, without limitation, at least one of an automatic location identification ("ALI") database, a master street address guide ("MSAG"), a United States postal service ("USPS") database, North American 9-1-1 Resource Database, a database associated with the service provider, or a database associated with a third party vendor, and/or the like.

At block 406, based on a determination that the set of 911 or E911 address data associated with the customer requires updating, method 400 may comprise determining, using the computing system, whether any address data associated with the customer is contained in at least one database accessible by the computing system and whether any address data associated with the customer that is contained in the at least one database has been validated or verified, wherein the at least one database is separate from the E911 database. If so, method 400 either may continue onto the process at block 408 or may continue onto the process at one of block 416 in FIG. 4B, block 418 in FIG. 4C, or block 422 in FIG. 4D, by following the circular marker denoted, "A." If not, method 400 may continue onto the process at block 410.

At block 408, based on a determination that the at least one database contains first address data associated with the customer that has been validated or verified, method 400 may comprise updating, using the computing system, the E911 database with the first address data associated with the customer that is contained in the at least one database and that has been validated or verified. Method 400 may continue onto the process at block 424 in FIG. 4E following the circular marker denoted, "E."

On the other hand, based on a determination that the at least one database does not contain any address data associated with the customer or that any address data associated with the customer that is contained in the at least one database has not been validated or verified, method 400 may comprise sending, using the computing system, a message to the customer to provide updated 911 or E911 address data (block 410); and receiving, using the computing system and from a user device associated with the customer via an application programming interface ("API") over a network operated by a service provider, updated 911 or E911 address data from the customer (block 412). In response to receiving updated 911 or E911 address data from the customer, method 400 either may continue onto the process at block 414 or may continue onto the process at block 416 in FIG. 4B by following the circular marker denoted, "C." At block 414, method 400 may comprise updating, using the computing system, the E911 database with the received updated 911 or E911 address data from the customer. Method 400 may continue onto the process at block 424 in FIG. 4E following the circular marker denoted, "E."

Turning to FIG. 4B, at block 416 (following either the circular marker denoted, "A," or the circular marker denoted, "C" in FIG. 4A), method 400 may comprise validating, using the computing system, any address associated with the customer that is being added or changed against a standard address format prior to updating the E911 database. In some embodiments, the standard address format may include, without limitation, one of an automatic location identification ("ALI") database address format, a master street address guide ("MSAG") address format, a United States Postal Service ("USPS") database address format, or North American 9-1-1 Resource Database address format, and/or the like. Method 400 may return to the corresponding process at block 408 in FIG. 4A following the circular marker denoted, "B," or the corresponding process at block 414 in FIG. 4A following the circular marker denoted, "D."

Referring to FIG. 4C (following the circular marker denoted, "A" in FIG. 4A), method 400 may comprise receiving, using the computing system, a passback of the first address data from the at least one database maintained by the third party vendor (in some cases, via an API, or the like) (block 418); and updating, using the computing system, the one or more address data associated with the customer contained in at least one database maintained by the service provider with the received first address data (block 420). Method 400 may return to the corresponding process at block 408 in FIG. 4A following the circular marker denoted, "B."

Alternatively, with reference to FIG. 4C (following the circular marker denoted, "A" in FIG. 4A), method 400 may comprise mirroring, using the computing system, the first address data associated with the customer contained in the at least one database maintained by the third party vendor and one or more address data associated with the customer contained in at least one database maintained by the service provider (block 422). Method 400 may return to the corresponding process at block 408 in FIG. 4A following the circular marker denoted, "B."

At block 424 in FIG. 4E (following the circular marker denoted, "E" in FIG. 4A), method 400 may comprise receiving, using the computing system and from the user device associated with the customer via the API, a status query regarding an E911 address change request. Method 400 may further comprise, at block 426, in response to receiving the status request, determining, using the computing system, a current status of a process for changing the E911 address associated with the customer. Method 400 may further comprise sending, using the computing system and to the user device, a message indicating the current status of the process for changing the E911 address associated with the customer (block 428).

Turning to FIG. 4F, in some embodiments, method 400 may further comprise, at block 430, receiving, using the computing system and from the user device associated with the customer via the API, a first request to validate at least one address associated with the customer. Method 400 may further comprise, in response to receiving the first request, validating, using the computing system, the at least one address against a standard address format (block 432). As indicated above, the standard address format may include, but is not limited to, one of an ALI database address format, a MSAG address format, a USPS database address format, or North American 9-1-1 Resource Database address format, and/or the like.

Alternatively, or additionally, referring to FIG. 4G, method 400 may further comprise receiving, using the computing system and from the user device associated with the customer via the API, a second request to obtain at least one current address associated with the customer from the E911 database (block 434). At block 436, method 400 may comprise, in response to receiving the second request, retrieving, using the computing system and from the E911 database, the requested at least one current address. Method 400 may further comprise, at block 438, sending, using the computing system and to the user device, the retrieved at least one current address.

Alternatively, or additionally, with reference to FIG. 4H, method 400 may further comprise, at block 440, receiving, using the computing system and from the user device associated with the customer via the API, a third request to obtain a list of remote locations associated with a service identifier ("ID") for the customer from a pipeline API. In response to receiving the third request, method 400 may further comprise retrieving, using the computing system and from the pipeline API, information regarding remote locations associated with the service ID for the customer (block 442), compiling, using the computing system, the list of remote locations associated with the service ID for the customer (block 444), and sending, using the computing system and to the user device, the compiled list of remote locations (block 446).

Alternatively, or additionally, with reference to FIG. 4I, method 400 may further comprise, at block 448, receiving, using the computing system and from the user device associated with the customer via the API, a fourth request to change at least one address associated with the customer in the E911 database, the fourth request comprising one or more telephone numbers associated with the customer and one or more updated addresses corresponding to each telephone number, each telephone number corresponding to the at least one address. At block 450, method 400 may further comprise, in response to receiving the fourth request, validating, using the computing system, each updated address among the one or more updated addresses in the fourth request. Method 400 may further comprise, after the one or more updated addresses have been validated, replacing, using the computing system, the at least one address in the E911 database with the validated one or more updated addresses (block 452), and sending, using the computing system and to the user device, a message confirming that the at least one address has been updated with the one or more updated addresses (block 454).

Exemplary System and Hardware Implementation

Figure 5:
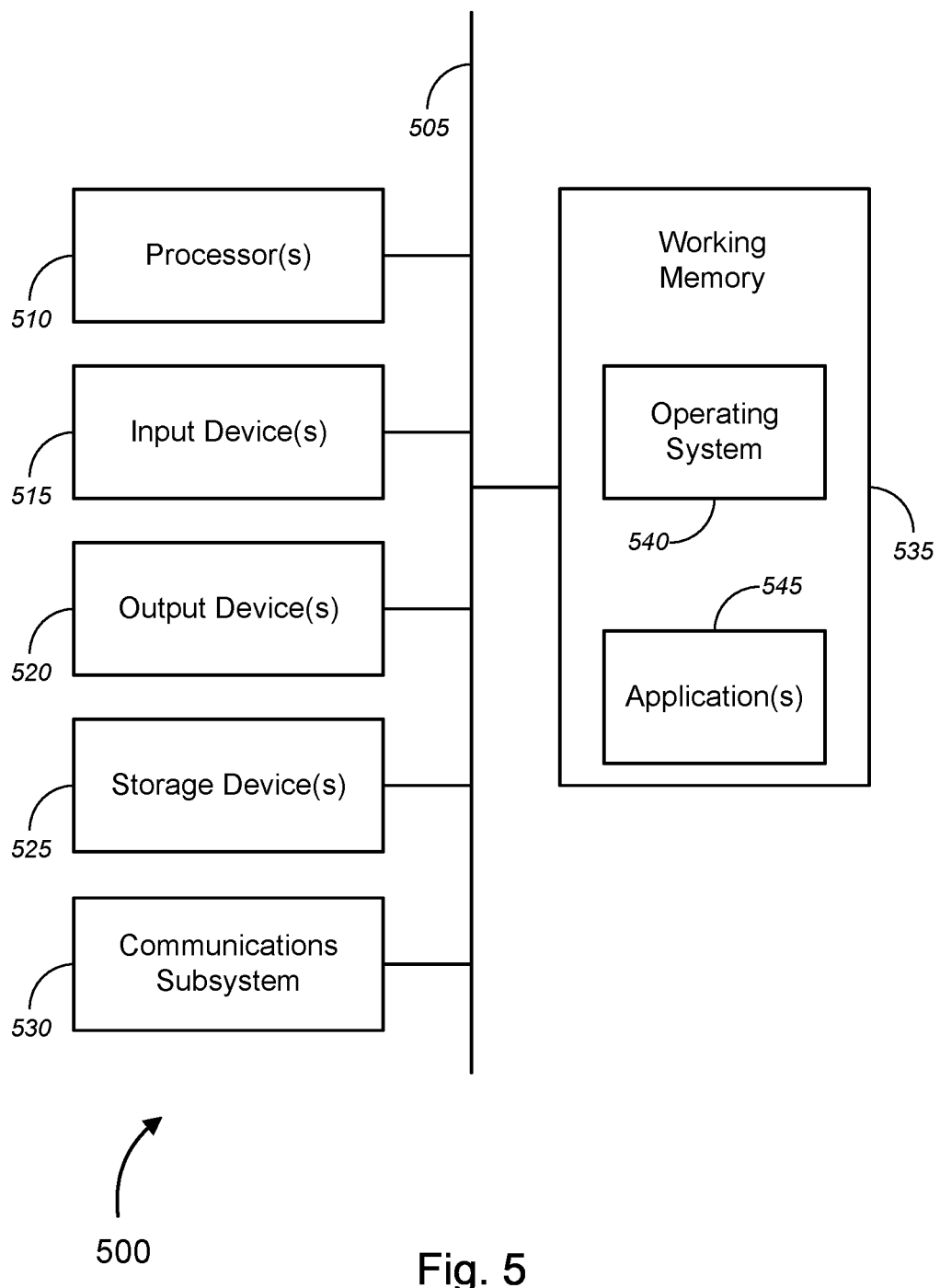
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing system 105, user device(s) 130, call devices 135a-135n, gateway 145a, address validation engine 155, routers 160, third party vendor servers or systems 165 and 280, public safety access points ("PSAPs") 175a-175n, geo-location system 185, application programming interface ("API") gateway 210, microservices 260a, 260b, 270a, and 270b, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing system 105, user device(s) 130, call devices 135a-135n, gateway 145a, address validation engine 155, routers 160, third party vendor servers or systems 165 and 280, PSAPs 175a-175n, geo-location system 185, API gateway 210, microservices 260a, 260b, 270a, and 270b, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
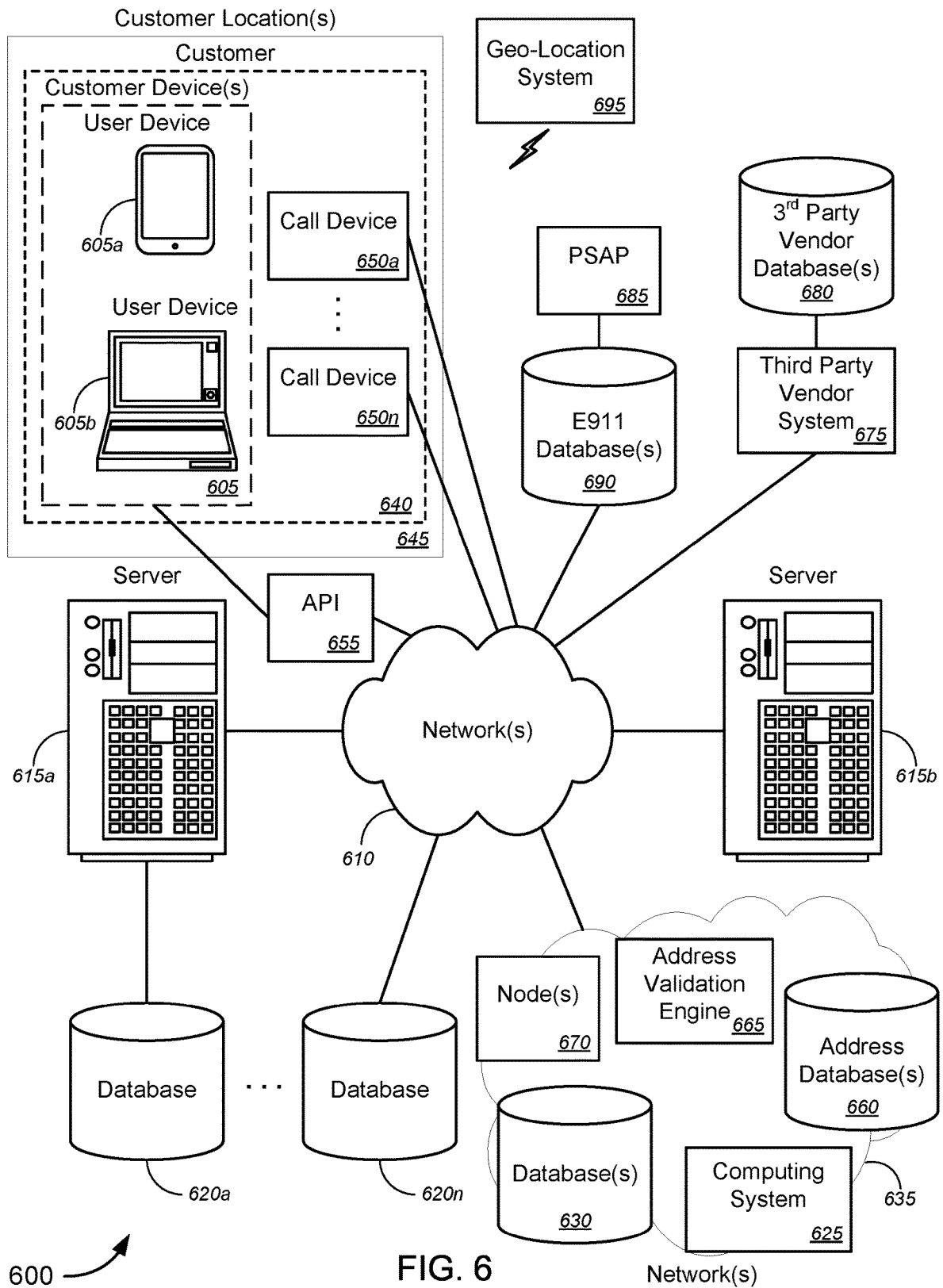
FIG. 6 is a block diagram illustrating a networked system of computers, computing systems, or system hardware architecture, which can be used in accordance with various embodiments.

As noted above, a set of embodiments comprises methods and systems for implementing public safety service point ("PSAP") operations and functionalities, and, more particularly, to methods, systems, and apparatuses for implementing 911 or enhanced 911 ("E911") address update. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 115 and 115a-115c of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing public safety service point ("PSAP") operations and functionalities, and, more particularly, to methods, systems, and apparatuses for implementing 911 or enhanced 911 ("E911") address update, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to computing system 105 of FIG. 1, or the like) and corresponding database(s) 630 (similar to database(s) 110 of FIG. 1, or the like) of network(s) 635 (similar to network(s) 115 and 115a-115c of FIG. 1, or the like). System 600 might further comprise an address database(s) 660 (similar to address database(s) 150 of FIG. 1, or the like), an address validation engine 665 (similar to address validation engine 155 of FIG. 1, or the like), and one or more nodes 670 (similar to routers 160 of FIG. 1, or the like), which may be disposed on network(s) 635. User devices 605a and 605b (collectively, "user devices 605" or the like; similar to user device(s) 130 of FIG. 1, or the like) and call devices 650a-650n (similar to call devices 135a-135n of FIG. 1, or the like) may be associated with customer 640 (similar to customer 120 of FIG. 1, or the like), which may be located or associated with customer location(s) 645 (similar to customer location(s) 125a-125n of FIG. 1, or the like). System 600 might further comprise application programming interface ("API") 655 (similar to API 145c of FIG. 1, or the like), a third party vendor server or system 675 (similar to third party vendor server or system 165 of FIG. 1, or the like) and corresponding third party vendor database(s) 680 (similar to third party vendor database(s) 170 of FIG. 1, or the like), a public safety access point ("PSAP") 685 (similar to PSAPs 175a-175n of FIG. 1, or the like) and corresponding E911 database(s) 690 (similar to E911 database(s) 180 of FIG. 1, or the like), and geo-location system 695 (similar to geo-location system 185 of FIG. 1, or the like).

In operation, in response to a trigger event, computing system 625 may determine whether a set of 911 or enhanced 911 ("E911") address data associated with a customer that is stored in an E911 database requires updating. Based on a determination that the set of 911 or E911 address data associated with the customer requires updating, the computing system 625 may determine whether any address data associated with the customer is contained in at least one database accessible by the computing system and whether any address data associated with the customer that is contained in the at least one database (e.g., service provide address database(s) 660 and/or third party vendor database (s) 680, or the like) has been validated or verified, where the at least one database is separate from the E911 database(s) 690. Based on a determination that the at least one database contains first address data associated with the customer that has been validated or verified, the computing system 625 may update the E911 database with the first address data associated with the customer that is contained in the at least one database and that has been validated or verified.

Based on a determination that the at least one database does not contain any address data associated with the customer 640 or that any address data associated with the customer 640 that is contained in the at least one database has not been validated or verified, the computing system 625 may send a message to the customer to provide updated 911 or E911 address data; may receive, from a user device associated with the customer via API 655 over a network(s) 610 and/or 635 operated by the service provider, updated 911 or E911 address data from the customer 640; and in response to receiving updated 911 or E911 address data from the customer 640, may update the E911 database 690 with the received updated 911 or E911 address data from the customer 640.

According to some embodiments, the trigger event may include, but is not limited to, one of: receiving an order to add, remove, or change telephone service associated with the customer; receiving an order to relocate at least one call device having a corresponding telephone number associated with the customer from a first area to a second area within a known geographic location associated with the customer; receiving an order to relocate at least one call device having a corresponding associated with the customer from a first area in a first location associated with the customer to a second area in a second location, the second location being in a geographically separate part of a region from the first location, wherein the region comprises one of a neighborhood, a campus, a section of a municipality, an entire municipality, a state, a collection of neighboring states, a country, or a continent; receiving an order to set up at least one work-from-home call device for a corresponding at least one employee of the customer, the at least one work-from-home call device having a corresponding telephone number associated with the customer; receiving a notification that a business telephone directory maintained by the customer has changed; receiving a notification that a telephone number associated with the customer is involved in a session initiation protocol ("SIP")-based communication from a location different from any E911 addresses associated with the customer as stored in the E911 database, based on geo-location data; receiving a notification indicating a change in geo-location data associated with a telephone number associated with the customer that is involved in a SIP-based communication; receiving a notification that a telephone number associated with the customer is involved in a SIP-based communication from a location different from any E911 addresses associated with the customer as stored in the E911 database, based on Internet Protocol ("IP") address data; receiving a notification indicating a change in IP address associated with a telephone number associated with the customer that is involved in a SIP-based communication; receiving a request from the customer to update at least one address in the E911 database; receiving a notification indicating that a third party vendor has changed at least one E911 address associated with the customer in at least one database; or receiving instructions to initiate an E911 address audit for the customer; and/or the like.

In some cases, the geo-location data—which may be provided to user device(s) 605a and/or 605b and/or call device(s) 650a-650n from a geo-location source such as geo-location system 695, or the like—may include, without limitation, one of global positioning system ("GPS") data, assisted GPS ("A-GPS") data, global navigation satellite system ("GLONASS") data, assisted GLONASS ("A-GLONASS") data, Galileo global navigation satellite system ("GNSS") data, BeiDou navigation satellite system ("BDS") data, geographic information system ("GIS") data, geocoded address data, cellular network radiolocation-based data, wireless phase one ("WPH1") location data, or wireless phase two ("WPH2") location data, and/or the like.

In some embodiments, determining whether the set of 911 or E911 address data associated with the customer requires updating may comprise determining whether the set of 911 or E911 address data requires updating based on one of: a transfer of telephone service for the customer from an unaffiliated service provider; a stated or detected change in geo-location data of at least one call device having a corresponding telephone number associated with the customer; a change in a business telephone directory maintained by the customer; a stated or detected change in Internet Protocol ("IP") address of at least one call device having a corresponding telephone number associated with the customer; a stated or detected change in at least one E911 address associated with the customer in at least one database maintained by a third party vendor; at least one call device having a corresponding telephone number associated with the customer being set up as a work-from-home call device for an employee of the customer; a determined discrepancy between at least one database maintained by the third party vendor and at least one database maintained by the service provider; a request to update at least one address in the E911 database; results of an E911 address audit for the customer; or whether any changes to at least one address associated with the customer affect any address contained within the set of 911 or E911 address data; and/or the like.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
in response to a trigger event, determining, using a computing system, whether a set of 911 or enhanced 911 ("E911") address data associated with a customer that is stored in an E911 database requires updating;

based on a determination that the set of 911 or E911 address data associated with the customer requires updating, determining, using the computing system, whether any address data associated with the customer is contained in at least one database accessible by the computing system and whether any address data associated with the customer that is contained in the at least one database has been validated or verified, wherein the at least one database is separate from the E911 database;

based on a determination that the at least one database contains first address data associated with the customer that has been validated or verified, updating, using the computing system, the E911 database with the first address data associated with the customer that is contained in the at least one database and that has been validated or verified;

based on a determination that the at least one database does not contain any address data associated with the customer or that any address data associated with the customer that is contained in the at least one database has not been validated or verified:
sending, using the computing system, a message to the customer to provide updated 911 or E911 address data;
receiving, using the computing system and from a user device associated with the customer via an application programming interface ("API") over a network operated by a service provider, updated 911 or E911 address data from the customer; and
in response to receiving updated 911 or E911 address data from the customer, updating, using the computing system, the E911 database with the received updated 911 or E911 address data from the customer, wherein, in response to the customer initiating a 911 emergency call, a third party vendor routes the 911 emergency call to a local public safety access point ("PSAP") on behalf of the customer or the service provider, wherein the first address data associated with the customer is validated or verified by the third party vendor.

2. The method of claim 1, wherein the computing system comprises at least one of an API platform computing system, an API gateway, a customer interface server, an E911 address change server, a gateway controller, a network operations center ("NOC"), a cloud computing system, or a distributed computing system.

3. The method of claim 1, wherein the trigger event comprises one of:
receiving an order to add, remove, or change telephone service associated with the customer;
receiving an order to relocate at least one call device having a corresponding telephone number associated with the customer from a first area to a second area within a known geographic location associated with the customer;
receiving an order to relocate at least one call device having a corresponding associated with the customer from a first area in a first location associated with the customer to a second area in a second location, the second location being in a geographically separate part of a region from the first location, wherein the region comprises one of a neighborhood, a campus, a section of a municipality, an entire municipality, a state, a collection of neighboring states, a country, or a continent;

receiving an order to set up at least one work-from-home call device for a corresponding at least one employee of the customer, the at least one work-from-home call device having a corresponding telephone number associated with the customer;

receiving a notification that a business telephone directory maintained by the customer has changed;

receiving a notification that a telephone number associated with the customer is involved in a session initiation protocol ("SIP")-based communication from a location different from any E911 addresses associated with the customer as stored in the E911 database, based on geo-location data;

receiving a notification indicating a change in geo-location data associated with a telephone number associated with the customer that is involved in a SIP-based communication;

receiving a notification that a telephone number associated with the customer is involved in a SIP-based communication from a location different from any E911 addresses associated with the customer as stored in the E911 database, based on Internet Protocol ("IP") address data;

receiving a notification indicating a change in IP address associated with a telephone number associated with the customer that is involved in a SIP-based communication;

receiving a request from the customer to update at least one address in the E911 database;

receiving a notification indicating that a third party vendor has changed at least one E911 address associated with the customer in at least one database; or receiving instructions to initiate an E911 address audit for the customer.

4. The method of claim 3, wherein the geo-location data comprises one of global positioning system ("GPS") data, assisted GPS ("A-GPS") data, global navigation satellite system ("GLONASS") data, assisted GLONASS ("A-GLONASS") data, Galileo global navigation satellite system ("GNSS") data, BeiDou navigation satellite system ("BDS") data, geographic information system ("GIS") data, geocoded address data, cellular network radiolocation-based data, wireless phase one ("WPH1") location data, or wireless phase two ("WPH2") location data.

5. The method of claim 1, wherein determining whether the set of 911 or E911 address data associated with the customer requires updating comprises determining, using the computing system, whether the set of 911 or E911 address data requires updating based on one of:

a transfer of telephone service for the customer from an unaffiliated service provider;

a stated or detected change in geo-location data of at least one call device having a corresponding telephone number associated with the customer;

a change in a business telephone directory maintained by the customer;

a stated or detected change in Internet Protocol ("IP") address of at least one call device having a corresponding telephone number associated with the customer;

a stated or detected change in at least one E911 address associated with the customer in at least one database maintained by the third party vendor;

at least one call device having a corresponding telephone number associated with the customer being set up as a work-from-home call device for an employee of the customer;

a determined discrepancy between at least one database maintained by the third party vendor and at least one database maintained by the service provider;

a request to update at least one address in the E911 database;

results of an E911 address audit for the customer; or whether any changes to at least one address associated with the customer affect any address contained within the set of 911 or E911 address data.

6. The method of claim 1, further comprising:

receiving, using the computing system, a passback of the first address data from the at least one database maintained by the third party vendor; and updating, using the computing system, the one or more address data associated with the customer contained in at least one database maintained by the service provider with the received first address data.

7. The method of claim 1, further comprising:

mirroring, using the computing system, the first address data associated with the customer contained in the at least one database maintained by the third party vendor and one or more address data associated with the customer contained in at least one database maintained by the service provider.

8. The method of claim 1, wherein one or more of the E911 database or the at least one database each comprises at least one of an automatic location identification ("ALI") database, a master street address guide ("MSAG"), a United States postal service ("USPS") database, North American 9-1-1 Resource Database, a database associated with the service provider, or a database associated with a third party vendor.

9. The method of claim 1, wherein receiving the updated 911 or E911 address data from the customer comprises receiving, using the computing system and via the API over the network, updated 911 or E911 address data from the customer through a user interface ("UI") displayed on the user device associated with the customer, wherein the UI comprises one of a portal-based UI, a webpage UI, or a software application ("app") UI running on the user device.

10. The method of claim 9, wherein the UI provides the customer with at least one of:

one or more options to update, enter, or save at least one E911 address associated with the customer, wherein each E911 address comprises a physical address that is provided to first responders in response to a 911 emergency call being initiated by the customer;

one or more options to update, enter, or save at least one primary address associated with the customer, wherein each primary address comprises a street address;

one or more options to update, enter, or save at least one secondary address associated with the customer, each secondary address comprises at least one of building number, floor, suite, or office number;

one or more options to update, enter, or save at least one service address associated with the customer, wherein each service address comprises one of a physical address at which service is provided to the customer by a service provider associated with one of the computing system or the network or a billing address associated with the customer;

one or more options to change at least one trigger event for updating at least one E911 address associated with the customer;

one or more options to synchronize at least one E911 address associated with the customer across at least two databases;

one or more options to notify the customer in the event of discrepancies in at least one E911 address associated with the customer that are found in two or more databases;

one or more options to notify the customer when at least one E911 address associated with the customer has been updated, changed, or deleted; or one or more options to update, enter, or save one or more telephone numbers associated with at least one E911 address associated with the customer.

11. The method of claim 1, further comprising:

validating, using the computing system, any address associated with the customer that is being added or changed against a standard address format prior to updating the E911 database, wherein the standard address format comprises one of an automatic location identification ("ALI") database address format, a master street address guide ("MSAG") address format, a United States Postal Service ("USPS") database address format, or North American 9-1-1 Resource Database address format.

12. The method of claim 1, further comprising:

receiving, using the computing system and from the user device associated with the customer via the API, a first request to validate at least one address associated with the customer; and in response to receiving the first request, validating, using the computing system, the at least one address against a standard address format, wherein the standard address format comprises one of an automatic location identification ("ALI") database address format, a master street address guide ("MSAG") address format, a United States Postal Service ("USPS") database address format, or North American 9-1-1 Resource Database address format.

13. The method of claim 1, further comprising:

receiving, using the computing system and from the user device associated with the customer via the API, a second request to obtain at least one current address associated with the customer from the E911 database; and in response to receiving the second request, retrieving, using the computing system and from the E911 database, the requested at least one current address, and sending, using the computing system and to the user device, the retrieved at least one current address.

14. The method of claim 1, further comprising:

receiving, using the computing system and from the user device associated with the customer via the API, a fourth request to change at least one address associated with the customer in the E911 database, the fourth request comprising one or more telephone numbers associated with the customer and one or more updated addresses corresponding to each telephone number, each telephone number corresponding to the at least one address;

in response to receiving the fourth request, validating, using the computing system, each updated address among the one or more updated addresses in the fourth request; and after the one or more updated addresses have been validated, replacing, using the computing system, the at least one address in the E911 database with the validated one or more updated addresses, and sending, using the computing system and to the user device, a message confirming that the at least one address has been updated with the one or more updated addresses.

15. The method of claim 1, further comprising:

receiving, using the computing system and from the user device associated with the customer via the API, a status query regarding an E911 address change request; and in response to receiving the status request, determining, using the computing system, a current status of a process for changing the E911 address associated with the customer, and sending, using the computing system and to the user device, a message indicating the current status of the process for changing the E911 address associated with the customer.

16. An apparatus, comprising:

at least one processor; and a non-transitory computer readable medium communicatively coupled to the at least one processor, the non-transitory computer readable medium having stored thereon computer software comprising a set of instructions that, when executed by the at least one processor, causes the apparatus to:

in response to a trigger event, determine whether a set of 911 or enhanced 911 ("E911") address data associated with a customer that is stored in an E911 database requires updating;

based on a determination that the set of 911 or E911 address data associated with the customer requires updating, determine whether any address data associated with the customer is contained in at least one database accessible by the computing system and whether any address data associated with the customer that is contained in the at least one database has been validated or verified, wherein the at least one database is separate from the E911 database;

based on a determination that the at least one database contains first address data associated with the customer that has been validated or verified, update the E911 database with the first address data associated with the customer that is contained in the at least one database and that has been validated or verified;

based on a determination that the at least one database does not contain any address data associated with the customer or that any address data associated with the customer that is contained in the at least one database has not been validated or verified:

send a message to the customer to provide updated 911 or E911 address data;

receive, from a user device associated with the customer via an application programming interface ("API") over a network operated by a service provider, updated 911 or E911 address data from the customer; and in response to receiving updated 911 or E911 address data from the customer, update the E911 database with the received updated 911 or E911 address data from the customer, wherein, in response to the customer initiating a 911 emergency call, a third party vendor routes the 911 emergency call to a local public safety access point ("PSAP") on behalf of the customer or the service provider, wherein the first address data associated with the customer is validated or verified by the third party vendor.

17. A system, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
in response to a trigger event, determine whether a set of 911 or enhanced 911 ("E911") address data associated with a customer that is stored in an E911 database requires updating;
based on a determination that the set of 911 or E911 address data associated with the customer requires updating, determine whether any address data associated with the customer is contained in at least one database accessible by the computing system and whether any address data associated with the customer that is contained in the at least one database has been validated or verified, wherein the at least one database is separate from the E911 database;
based on a determination that the at least one database contains first address data associated with the customer that has been validated or verified, update the E911 database with the first address data associated with the customer that is contained in the at least one database and that has been validated or verified;
based on a determination that the at least one database does not contain any address data associated with the customer or that any address data associated with the customer that is contained in the at least one database has not been validated or verified:
send a message to the customer to provide updated 911 or E911 address data;
receive, from a user device associated with the customer via an application programming interface ("API") over a network operated by a service provider, updated 911 or E911 address data from the customer; and
in response to receiving updated 911 or E911 address data from the customer, update the E911 database with the received updated 911 or E911 address data from the customer,
wherein, in response to the customer initiating a 911 emergency call, a third party vendor routes the 911 emergency call to a local public safety access point ("PSAP") on behalf of the customer or the service provider, wherein the first address data associated with the customer is validated or verified by the third party vendor.

18. The system of claim 17, wherein the computing system comprises at least one of an API platform computing system, an API gateway, a customer interface server, an E911 address change server, a gateway controller, a network operations center ("NOC"), a cloud computing system, or a distributed computing system.

* * * * *